US010992487B2

(12) United States Patent
Park et al.

(10) Patent No.: US 10,992,487 B2
(45) Date of Patent: Apr. 27, 2021

(54) INSTANT MESSAGING SERVICE METHOD FOR PROVIDING SCHEDULE SERVICE AND APPARATUS THEREFOR

(71) Applicant: KAKAO CORP., Jeju-si (KR)

(72) Inventors: Hyun Na Park, Seongnam-si (KR); Won Iel Yoo, Yongin-si (KR); Hoi Moon Jeong, Incheon (KR); Seung Uk Jeong, Seoul (KR); Moon Seok Park, Seongnam-si (KR); Mi Jin Kim, Seongnam-si (KR); Se Hyun Park, Bucheon-si (KR); Yeon Jin Lee, Seoul (KR); Kyung Don Kang, Yongin-si (KR)

(73) Assignee: KAKAO CORP., Jeju-si (KR)

(*) Notice: Subject to any disclaimer, the term of this patent is extended or adjusted under 35 U.S.C. 154(b) by 0 days.

(21) Appl. No.: 16/691,606

(22) Filed: Nov. 22, 2019

(65) Prior Publication Data

US 2020/0169426 A1 May 28, 2020

(30) Foreign Application Priority Data

Nov. 22, 2018 (KR) .................. 10-2018-0145514
Sep. 17, 2019 (KR) .................. 10-2019-0114407
Oct. 24, 2019 (KR) .................. 10-2019-0133234

(51) Int. Cl.
*H04L 12/18* (2006.01)
*H04L 12/58* (2006.01)

(52) U.S. Cl.
CPC ...... *H04L 12/1818* (2013.01); *H04L 12/1895* (2013.01); *H04L 51/02* (2013.01); *H04L 51/046* (2013.01)

(58) Field of Classification Search
CPC ............ H04L 12/1818; H04L 12/1895; H04L 12/1822; H04L 51/02; H04L 51/046;
(Continued)

(56) References Cited

U.S. PATENT DOCUMENTS

| 2008/0114716 A1* | 5/2008 | Mock ................... G06Q 10/109 |
| 2010/0251119 A1* | 9/2010 | Geppert .............. G06F 3/04817 |
| | | 715/716 |

(Continued)

FOREIGN PATENT DOCUMENTS

| JP | 2007193794 A | 8/2007 |
| KR | 1020140068469 A | 6/2014 |

(Continued)

OTHER PUBLICATIONS

English Abstract of JP 2007-193794.

(Continued)

*Primary Examiner* — Le H Luu
(74) *Attorney, Agent, or Firm* — Cantor Colburn LLP

(57) ABSTRACT

An operation method for an instant messenger server is provided. The method includes generating a schedule which depends on an account of a host in response to a schedule generation request of the host, determining invitees based on at least one of a chat room list and a friend list of the account of the host, synchronizing schedules which depend on accounts of users who participate in the schedule, based on whether at least one guest included in the invitees participates, and providing a notification of the schedule to at least one of the users who participate in the schedule, through a user interface (UI) of a chat room provided through the instant messaging service.

24 Claims, 13 Drawing Sheets

(58) Field of Classification Search
CPC ... H04L 67/22; G06F 3/04817; G06Q 10/109; G06Q 10/1093; G06Q 10/1095; G06Q 50/167; G06Q 50/20
See application file for complete search history.

(56) References Cited

U.S. PATENT DOCUMENTS

| | | | | |
|---|---|---|---|---|
| 2013/0122479 A1* | 5/2013 | Harla | G06Q 50/20 | 434/322 |
| 2013/0253972 A1* | 9/2013 | Jervis | G06Q 10/1095 | 705/7.19 |
| 2014/0036733 A1* | 2/2014 | Teng | G06Q 10/109 | 370/260 |
| 2015/0356516 A1* | 12/2015 | Kagan | G06Q 10/1095 | 705/7.19 |
| 2016/0078411 A1* | 3/2016 | DiCarlo | G06Q 50/167 | 705/316 |
| 2016/0098687 A1* | 4/2016 | Lamons | G06Q 10/1095 | 705/7.19 |
| 2016/0267404 A1* | 9/2016 | Shicoff | G06Q 10/1093 | |
| 2017/0193457 A1* | 7/2017 | Shukla | H04L 51/046 | |
| 2017/0293458 A1* | 10/2017 | Poel | H04L 12/1822 | |
| 2019/0052701 A1* | 2/2019 | Rathod | H04L 67/22 | |

FOREIGN PATENT DOCUMENTS

| | | |
|---|---|---|
| KR | 1020140086549 A | 7/2014 |
| KR | 1020170125593 A | 11/2017 |

OTHER PUBLICATIONS

English Abstract of KR 10-2014-0068469.
English Abstract of KR 10-2014-0086549.
English Abstract of KR 10-2017-0125593.
English Translation of Non-Patent Literature Reference (D2) listed in JP Office Action dated Nov. 10, 2020 in corresponding JP application No. 2019-209015.
English Translation of Non-Patent Literature Reference (D3) listed in JP Office Action dated Nov. 10, 2020 in corresponding JP application No. 2019-209015.
English Translation of Office Action dated Nov. 10, 2020, for the corresponding JP 2019-209015.
English Translation of Office Action dated Nov. 29, 2020, for the corresponding KR 10-2019-0133234.

* cited by examiner

INSTANT MESSAGING SERVICE METHOD FOR PROVIDING SCHEDULE SERVICE AND APPARATUS THEREFOR

CROSS-REFERENCE TO RELATED APPLICATION(S)

This application claims the priority benefit of Korean Patent Application No. 10-2018-0145514 filed on Nov. 22, 2018, Korean Patent Application No. 10-2019-0114407 filed on Sep. 17, 2019, and Korean Patent Application No. 10-2019-0133234 filed on Oct. 24, 2019, in the Korean Intellectual Property Office, the disclosures of which are incorporated herein by reference for all purposes.

BACKGROUND

1. Field

Embodiments of the inventive concept described herein relate to an instant messaging service method for providing a schedule service and an apparatus therefor.

2. Description of Related Art

A user may participate in a plurality of various chat rooms through an instant messenger server to chat with other participants and/or share data with the other participants. In addition, the instant messenger server may provide a calendar causing the user to well manage a schedule. However, the calendar provided by the instant messenger server depends on a chat room, and a schedule of the calendar is generated for each chat room. Furthermore, schedule information is opened to participants who are participating in the chat room, and information about all schedules is opened irrespective of a time when the participants participate in the chat room. Due to this, it is difficult to manage a personal schedule on an instant messaging service.

SUMMARY

According to an exemplary embodiment, an operation method of an instant messenger server for providing a schedule service may include generating a schedule which depends on an account of a host for an instant messaging service in response to a schedule generation request of the host, determining invitees based on at least one of a chat room list of the account of the host and a friend list of the account of the host, synchronizing schedules which depend on accounts of users who participate in the schedule, based on whether at least one guest included in the invitees participates, and providing a notification about the schedule to at least one of the users who participate in the schedule, through a user interface (UI) of a chat room provided through the instant messaging service.

The chat room may include at least one of a chat room for an official account corresponding to the schedule service and a chat room in which the host is participating and the schedule generation request occurs.

The notification about the schedule may include at least one of a message for providing a notification that the schedule is generated, a message for providing a notification that the schedule is changed, and a message for providing a pre-notification of the schedule.

The method may further include transmitting a message for inviting the at least one guest included in the invitees to the schedule through the UI of the chat room.

The providing of the notification about the schedule may include at least one of transmitting a message for providing a notification of the schedule to a chat room for an official account corresponding to the schedule service, transmitting a message for providing a notification of the schedule to a chat room based on whether the schedule generation request occurs through the chat room in which the host is participating, and transmitting a message for providing a notification of the schedule to a chat room requested for sharing by the host, based on a schedule sharing request of the host.

The schedule generation request may be received in the form of a message using a chatbot function provided by a chat room for an official account corresponding to the schedule service.

The method may further include receiving a message for requesting to edit a schedule which depends on the account of the host, using a chatbot function provided by a chat room for an official account corresponding to the schedule service, editing the schedule which depends on the account of the host, and synchronizing schedules which depend on accounts of users who participate in the edited schedule.

The UI of the chat room may include a speech balloon of which a sender is set to an official account corresponding to the schedule service as a sender.

A schedule which depends on an account of a user for the instant messaging service may include a schedule registered with a calendar for each user. The calendar for each user may include a plurality of schedules registered through a plurality of chat rooms in which the user participates.

The method may further include, when the schedule generation request of the host is generated through a specific chat room, automatically inputting users who are participating in the chat room as the invitees.

The method may further include at least one of providing a candidate chat room including an invitee included in participant information, in response to a chat request associated with the schedule, providing a candidate chat room including a target to be attended among invitees included in the participant information, in response to the chat request associated with the schedule, generating a new chat room including an invitee included in the participant information, in response to the chat request associated with the schedule, and generating a new chat room including a target to be attended among the invitees included in the participant information, in response to the chat request associated with the schedule.

The method may further include receiving an invitation request from a user who does not correspond to the invitees among users of a chat room with which the schedule is shared, receiving whether to accept the invitation request from a host of the schedule, and updating participant information included in the schedule, based on whether the host accepts the invitation request.

According to an exemplary embodiment, an operation method of an instant messenger application for providing a schedule service may include transmitting a schedule generation request for generating a schedule which depends on an account of a user for an instant messaging service, receiving invitees who are invited to the schedule based on at least one of a chat room list of the account of the user and a friend list of the account of the user, synchronizing schedules which depend on accounts of users who participate in the schedule, based on whether at least one guest included in the invitees participates, and providing a notification about the schedule to at least one of the users who participate in the schedule, through a UI of a chat room provided through the instant messaging service.

The chat room may include at least one of a chat room for an official account corresponding to the schedule service and a chat room in which a host is participating and the schedule generation request occurs.

The notification about the schedule may include at least one of a message for providing a notification that the schedule is generated, a message for providing a notification that the schedule is changed, and a message for providing a pre-notification of the schedule.

The method may further include transmitting a message for inviting the at least one guest included in the invitees to the schedule through the UI of the chat room.

The providing of the notification about the schedule may include at least one of transmitting a message for providing a notification of the schedule to a chat room for an official account corresponding to the schedule service, transmitting a message for providing a notification of the schedule to a chat room based on whether the schedule generation request occurs through the chat room in which a host is participating, and transmitting a message for providing a notification of the schedule to a chat room requested for sharing by the host, based on a schedule sharing request of the host.

The schedule generation request may be received in the form of a message using a chatbot function provided by a chat room for an official account corresponding to the schedule service.

The method may further include receiving a message for requesting to edit a schedule which depends on an account of a host, using a chatbot function provided by a chat room for an official account corresponding to the schedule service, editing the schedule which depends on the account of the host, and synchronizing schedules which depend on accounts of users who participate in the edited schedule.

The UI of the chat room may include a speech balloon of which a sender is set to an official account corresponding to the schedule service.

The method may further include displaying a plurality of schedules registered through a plurality of chat rooms in which the user participates, on a calendar for each user.

The method may further include at least one of displaying a candidate chat room including an invitee included in participant information, in response to a chat request associated with the schedule, displaying a candidate chat room including a target to be attended among invitees included in the participant information, in response to the chat request associated with the schedule, displaying a new chat room including an invitee included in the participant information, in response to the chat request associated with the schedule, and displaying a new chat room including a target to be attended among the invitees included in the participant information, in response to the chat request associated with the schedule.

The method may further include transmitting a request to share the schedule to the server through the instant messaging service, receiving an invitation request of a user who does not correspond to the invitees among users of a chat room with which the schedule is shared, receiving whether to accept the invitation request, and transmitting information for updating participant information included in the schedule, based on whether to accept the invitation request:

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
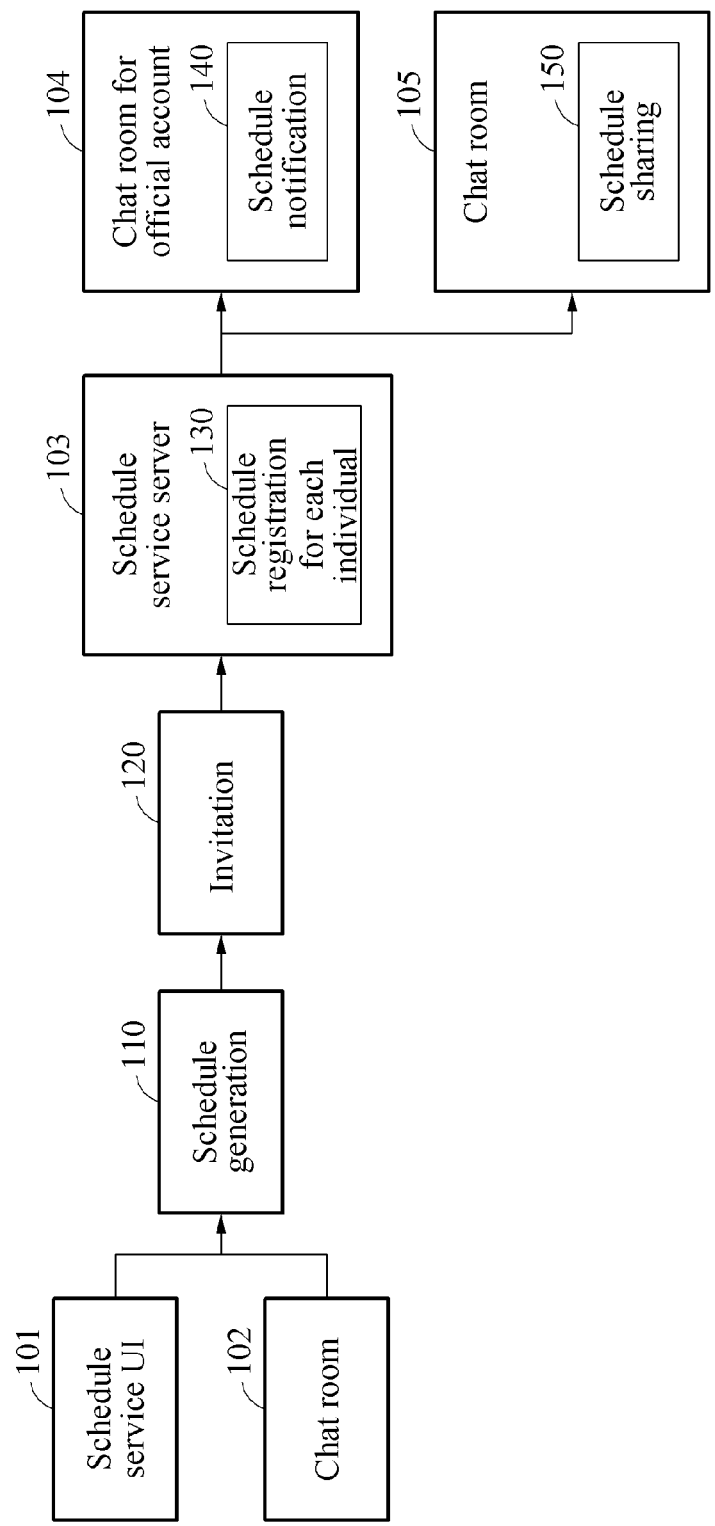
FIG. 1 is a drawing illustrating an operation method of an instant messenger server which provides a schedule service according to an embodiment.

Hereinafter, embodiments are described in detail with reference to the accompanying drawings. With respect to the descriptions of the drawings, like reference numerals refer to like elements. Various modifications are possible in various embodiments described below. Embodiments described below are not intended to be limited to the implementation forms, and it is understood that it should include all modifications, equivalents, and/or alternatives according to various embodiments.

The terminology used herein is used to describe specified embodiments and is not intended to limit the embodiments. The expression of singular number includes the expression of plural number unless clearly intending otherwise in a context. In the specification, it should be understood that terms of 'comprise', 'have', and the like are to designate the existence of a feature disclosed in the specification, a numeral, a step, an input, a constituent element, a part, or a combination thereof, and do not previously exclude a possibility of existence or supplement of one or more other features, numerals, steps, inputs, constituent elements, parts, or combinations thereof.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the inventive concept.

Furthermore, in describing embodiments with reference to the accompanying drawings, the same reference denotations are assigned to the same elements without regard to the drawing denotations, a duplicated description thereof will be omitted. When it is determined that a detailed description of the related well-known technology unnecessarily blurs the gist of embodiments in describing embodiments, a detailed description thereof will be omitted.

Embodiments described below may provide a personal schedule management function which interworks with an instant messaging service. For example, embodiments described below may provide a function of registering and sharing a schedule during a chat and easily inviting a friend to the schedule after generating the schedule. Furthermore, embodiments described below may interworks with a schedule stored in a smartphone or the like of a user and may efficiently manage a personal schedule.

FIG. 1 is the entire flowchart of a schedule management function which interworks with an instant messaging service according to an embodiment. Referring to FIG. 1, the schedule management function provided by the instant messaging service may include a function of generating a schedule, a function of inviting an invitee to the schedule, a function of sharing the schedule, a function of providing a notification associated with the schedule, or the like.

According to an embodiment, a guest associated with a host may be invited to a schedule generated by a request of the host. Hereinafter, the "host" may be referred to as a user who generates a schedule among users who use the instant messaging service, and an invitee invited to the schedule may be referred to as the "guest". For example, the host may select or determine an invitee to be invited to a schedule among other users who use the instant messaging service. Alternatively, guests associated with a host and/or a generated schedule may be automatically selected or determined as invitees depending on a predetermined policy.

A terminal of the host or a terminal of the guest may be driven by an application installed in the terminal. For example, an instant messenger application which provides a service of managing a schedule which depends on an account of the host to a user may be installed in each terminal. The application may include an application or the like which provides a social networking service or an instant messaging service. The terminal according to an embodiment may include, for example, a personal computer (PC), a netbook, a notebook, a personal digital appliance (PDA), a smartphone, a wearable device, and various user display devices which perform a similar function.

A server may interwork with an instant messenger application installed in each of terminals of the host and the guest for a user interface (UI), a function, an operation, a service, or the like.

The server may include a first server for providing a schedule service and a second server for providing an instant messaging service. As an example, the schedule service may provide a function capable of seeing all schedules generated by interworking with an account of the instant messaging service at a glance. Through the schedule service, the server may register a new schedule during a chat, or may easily invite users who have a friend relationship in the instant messaging service or users who are participating in the same chat room to a specific schedule and may easily share the schedule with the users. Besides, the server may identify a birthday of a user who has a friend relationship in the instant messaging service and may also identify the lunar calendar, a national holiday, an anniversary, or the like. In addition, when it is permitted to access schedules stored in a user's personal mobile phone rather than a schedule which interworks with an account of the instant messaging service, the server may interwork with the account of the instant messaging service to provide convenience capable of efficiently managing the schedules.

The first server and the second server may be implemented on a single server or may be implemented as separate servers. The schedule service and the instant messaging service may interwork with each other through interworking between the first server and the second server.

For example, the first server may provide a service of schedule generation 110, invitation 120, and schedule registration 130 for each individual. The schedule generation 110 may be an operation of requesting to generate a network schedule by the host and may include an operation of requesting to generate a schedule including information, for example, a title, a start date, an end date, a place, an invitee of the schedule. The invitation 120 may be an operation of selecting or determining targets who will participate together in the schedule and may include, for example, an operation of selecting or determining, by the host, a target who will respond to whether to participate in the schedule among other users who use the instant messaging service or an operation of selecting or determining a target who will automatically respond to whether to participate in the schedule depending to a predetermined policy. The schedule registration 130 for each individual may be an operation of separately registering a schedule which depends on an account of a guest who is invited to a schedule with a calendar of the guest and may include, for example, an operation of generating at least one schedule which depends on an account of at least one guest based on a schedule which depends on an account of the host.

Furthermore, the first server may interwork with an instant messenger application to provide a schedule service UI 101 to a user. The schedule service UI 101 may correspond to a UI of a schedule management service which interworks with the instant messaging service and may be used as the user selects a 'calendar' sub-menu which appears by pressing a specific menu located on an input window in a chat room.

For example, a side menu and/or a plus menu may be provided in a chat room of the instant messaging service to interwork with various functions such as a schedule management function. The side menu may be a menu for providing additional functions on a side of a chat room screen by selecting a predetermined UI on a chat room. As an example, when a schedule is generated in a specific chat room, the chat room and the schedule may be mapped to each other and my recent schedule (a recent schedule of a corresponding user) may be exposed on a side menu of the chat room.

Moreover, the plus menu may be a menu for providing additional functions to a virtual keyboard region, a pop-up window region, or the like by selecting a predetermined UI (e.g., a '+' button or the like) on a chat room. A user may access a schedule management function (a schedule service) using the menus. According to an embodiment, a schedule may be generated on the basis of a member of the chat room using the plus menu of the chat room. When a schedule is generated in a specific chat room, a speech balloon for providing a notification that the schedule is generated once may be transmitted to the chat room.

According to an embodiment, when a user enters a title, a schedule, a place, and the like in a UI displayed by selecting the 'calendar' sub-menu, selects a friend he or she wants to invite, and selects a 'send' or 'register' button, a schedule may be generated and shared using a speech balloon in a chat room. Registered schedules may be identified using a side menu of a right upper end of the chat room and may be determined and managed at a glance using a card view on a monthly or daily basis.

The second server may provide a service of schedule notification 140 and schedule sharing 150. The schedule notification 140 may be an operation of providing a notification of information associated with a schedule and may include, for example, an operation of providing information for providing a notification that the schedule is generated, information for providing a notification that an invitee is invited to the schedule, information for providing a notification that the schedule is changed, or information for providing a pre-notification of the schedule. The schedule sharing 150 may be an operation of sharing the schedule with another user who uses an instant messaging service through a chat room and may include, for example, an operation of sharing the schedule through a 1:1 chat room between a separate user and a host or sharing the schedule through a group chat room in which three or more users including the host are participating.

Furthermore, the second server may interwork with the instant messenger application to provide a chat room 102, a chat room 105, and a chat room 104 for an official account to a user.

The chat room 102 may correspond to a chat room requested to generate a schedule by the host. The chat room 105 may correspond to a chat room requested to share a schedule by the host. The chat room 102 and the chat room 105 may be the same as each other or may differ from each other. For example, schedule S by the host may be generated through a 1:1 chat room between the host and user A and may be shared with a 1:1 chat room between the host and user B by a schedule sharing function. In this case, the chat room 102 may correspond to the 1:1 chat room between the host and user A, and the chat room 105 may correspond to the 1:1 chat room between the host and user B.

The chat room 104 for the official account may be a dedicated chat room for the official account, provided for each user, and may include, for example, a dedicate chat room for an official account corresponding to a schedule service. The chat room 104 for the official account may be independently provided to each of users. For example, although user A and user B access a chat room for the same official account, an instance of a dedicated chat room actually provided to user A and an instance of a dedicated chat room actually provided to user B may be distinguished from each other.

The official account may be a company account or a chatbot distinguished from a general personal account which joins the instant messaging service and may use a differentiated messaging function which is not provided to the general personal account in the instant messaging service. For example, the official account may transmit an information message or an advertisement message to users who have a friend relationship (or a subscription relationship) with the official account. Alternatively, according to an embodiment, the official account may transmit information message to at least one user irrespective of a friend relationship.

As an example, the users may receive information message associated with a schedule from the official account corresponding to the schedule service, irrespective of whether they have a friend relationship. Thereafter, when the users establish a friend relationship with the official account corresponding to the schedule service, they may receive an advertisement message associated with the schedule as well as the information message. According to an embodiment, a message transmitted by the official account may correspond to a form of a speech balloon of which a sender is set to the official account. According to an embodiment, the speech balloon of which the sender is set to the official account may be provided in the form of being distinguished from a general speed balloon (e.g., a system message or the like capable of having an appearance distinguished from the appearance of the speech balloon and including various types of information).

The official account of the schedule service may change functions or settings of the chat room 104 provided to users in various manners. For example, the official account of the schedule service may enable a chatbot function, may be set to connect with a counselor through a corresponding chat room, and may set a UI or the like of the chat room.

Hereinafter, a description will be given in detail of an embodiment of FIG. 1.

The schedule notification 140 may be an operation of notifying a terminal of a user of information associated with a schedule through a UI provided from the instant messaging service and may be generated, for example, when the schedule is generated, when an invitee is invited to the schedule, or when the schedule is changed. Furthermore, the schedule notification 140 may be generated for a pre-notification of the schedule. A description will be given below of a detailed case where the schedule notification 140 occurs.

According to an embodiment, the schedule notification 140 may be provided through the official account corresponding to the schedule service. For example, the official account of the schedule service may take charge of interworking with the instant messaging service to provide a notification of a schedule. A notification may be provided to a schedule (a host) directly registered by a user or a schedule (a guest) invited by a friend through the official account of the schedule service, and efficiency of operation of a meeting, a conference, or the like may be enhanced through a response to whether to attend the schedule. Furthermore, when schedule contents are changed, a notification may be automatically transmitted through the official account of the schedule service.

The UI provided by the instant messaging service may include a UI separately provided by an instant messenger for the schedule service, for example, a UI for seeing a schedule at a glance or a news UI, as well as a UI for a chat room, for example, a chat room for the official account of the schedule service, a general chat room in which a user is participating, or a chat room for chatting with the user oneself According to an embodiment, notification information for the schedule notification 140 may be provided in a suitable form according to a used UI. For example, in the chat room UI, a notification message for the schedule notification 140 may be provided in the form of a speech balloon. Furthermore, in a separate UI for a schedule service, notification information for the schedule notification 140 may be provided in various forms suitable for the UI.

The chat room UI for the schedule notification 140 may include the chat room 104 for the official account corresponding to the schedule service, the chat room 102 requested to generate a schedule by a host, and/or the chat room 105 requested to share the schedule by the host. The notification message for the schedule notification 140 may be provided to a chat room UI in the form of a speech balloon of which a sender is set to the official account of the schedule service. For example, the official account corresponding to the schedule service may provide a notification through the chat room 104 and may provide a notification through the general chat rooms 102 and 105 associated with a schedule according to an embodiment.

The schedule generation 110 may include an operation where the host requests the server to generate a schedule through the schedule service UI 101, the chat room 102, or the like. The schedule service UI 101 may include a separate view provided through an instant messenger, a UI of a separate application called by the instant messenger, a UI of a webpage provided to a schedule service, or the like.

The chat room 102 may include a general type of chat room in which a user is participating to chat with at least one or more other users. According to an embodiment, the generation of a schedule may be requested through an additional function menu or the like provided by the chat room 102. Alternatively, when the official account of the schedule service is participating in the form of a chatbot, the generation of a schedule may be requested in the form of a message. Although not illustrated in the drawing, according to an embodiment, a schedule generation request may be input through the chat room 104 for the official account and a chat room for chatting with the user oneself. As an example, a schedule generation request may be transmitted to the server in the form of a message by a chatbot function provided by the chat room 104 for the official account corresponding to the schedule service. Furthermore, a schedule generation request may be input through a predetermined type of chat room to chat with the user oneself.

According to an embodiment, when a chatbot function is enabled in the chat room 104, interaction with a user may be provided in the form of a chat. A chatbot may be an interactive interface provided by the instant messaging service and may design an automatic response function, a function of processing a natural language command, or the like through an open source. For example, as a chatbot function is enabled, a request input to a chat window by a user may be transmitted to the server and an operation corresponding to the request may be provided to a user terminal.

For example, the official account of the schedule service may automatically respond to a query associated with a schedule management function using the chatbot function, or may receive a command to generate a schedule, invite an invitee, or change the schedule in the form of a chat and may perform a schedule management function the user wants. Furthermore, according to an embodiment, a chatbot function of the official account of the schedule service may be enabled in a general chat room by an action of inviting the official account of the schedule service in the general chat room or an option of setting a chat room.

Alternatively, the schedule service may be implemented in the form of a chatbot independently of the official account. Herein, in this case, the above-mentioned notification function or chatbot function may be provided in substantially the same manner.

The server may generate a schedule which depends on an account of the host for the instant messaging service in response to a schedule generation request of the host (see reference numeral 110). When the schedule is generated, the server may notify a terminal of the host that the schedule is generated, using the schedule notification 140. In this case, a calendar including the schedule may depend on the account of the host rather than a chat room, and a separate schedule included in the calendar may also depend on the account of the host. That the schedule depends on the account may mean that the schedule is registered with a calendar for a specific account (or a calendar for each user). For example, when the schedule depends on the account, although a plurality of schedules are generated through a plurality of chat rooms, the plurality of schedules may be registered with the same calendar for the account of the host. On the other hand, when a schedule depends on a chat room and when the plurality of schedules are generated through the plurality of chat rooms, each of the plurality of schedules may be registered with a different calendar for a corresponding chat room.

When the schedule is generated, the host may be invited as a guest of the schedule generated by selecting an invitee he or she wants to share the schedule with (see reference numeral 120). When the guest is invited, the server may notify a terminal of the guest that the guest is invited to the schedule using the schedule notification 140. In this case, the invitee may be determined based on a chat room list of an account of the host and/or a friend list of the account of the host on the instant messaging service. In this case, the chat room list may be used as a list for easily selecting a list of grouped friends.

To receive an invitee from the host, a picker interface including a chat room list and/or a friend list may be provided through a terminal of the host. According to an embodiment, when the generation of the schedule is requested through the general chat room 102, the chat room or participants of the chat room may be automatically input as invitees.

The server may register a corresponding schedule with a personal calendar of a guest in response to the schedule invitation 120 of the host (see reference numeral 130). In this case, the schedule registered with the personal calendar of the guest may be a schedule which depends on an account of the guest. A description will be given in detail of the schedule registration 130 for each individual.

According to an embodiment, the schedule which depends on the account of the host may be shared through the chat room 105 (see reference numeral 150). As an example, as the invitee is determined, the server may automatically determine the chat room 105 to share the schedule based on the invitee. For example, the server may determine a 1:1 chat room between a separate user included in the invitees and the host as a chat room to share the schedule or may determine a group chat room between users included in the invitees and the host as a chat room to share the schedule. Alternatively, the server may receive a chat room to share the schedule from a terminal of the host. For example, the server may recommend a plurality of candidate chat rooms to share the schedule to a user and may determine a chat room to share the schedule depending on the selection of the user. When the chat room to share the schedule is determined, the server may notify the chat room 105 to share the schedule that the schedule is shared, using the schedule notification 140. As the server shares the schedule with the chat room 105, the host and the guest may identify the schedule through the chat room 105.

According to an embodiment, the 'inviting' is an action of specifying users who participates together in a schedule on a schedule service, and the 'sharing' is an action of transmitting a message for sharing a schedule using a messaging service. A target of the 'inviting' and a target of the 'sharing' may be the same as each other or may differ from each other. For example, after invitees are designated as user A and user B, when schedule S is generated, schedule S may be shared with group chat room G in which user A, user B, and user C are participating. In this case, although user C is not an invitee of schedule S, he or she may receive schedule S through group chat room G.

As such, all the users of the chat room with which the schedule is shared do not correspond to invitees. A description will be given below, but, in this case, a user who does not correspond to an invitee among the users of the chat room with which the schedule is shared may transmit an invitation request for requesting to the host to invite himself or herself. When the invitation request is accepted from the host of the schedule, the user who does not correspond to the invitee may participate as a guest in the schedule.

The server may register the schedule with a personal calendar of a guest who is included in invitees in response to a request of the host for the schedule sharing 150 and/or a guest who is included in invitees as the host accepts the invitation request of the user of the shared chat room (see reference number 130). In this case, the schedule registered with the personal calendar of the guest may be a schedule which depends on an account of the guest.

When the schedule is registered with the personal calendar of the guest (130), the guest may input whether to participate in the invited schedule. For example, the guest may input whether to attend the schedule, whether not to attend the schedule, or whether not to decide to attend the schedule. The server may update participant information included in a schedule which depends on an account of the host, based on whether the guest participates. The participant information may include information about invitees and/or information about a response to whether the invitees participate (e.g., a response of "attend", "not-attend", or "maybe").

The server may synchronize schedules which depend on an account of a guest of the schedule, based on the updated participant information. According to an embodiment, the server may synchronize schedules which depend on accounts of invitees invited to the schedule or may synchronize schedules which depend on accounts of participation targets who notify the server of an intention to participate in the schedule among the invitees. For example, the server may synchronize a schedule which depends on the account of the host with a schedule which depends on an account of a guest who notifies the server of an intention to participate in the schedule.

According to an embodiment, when the guest selects to participate in the schedule, the server may synchronize a schedule which depends on an account of a host with a schedule which depends on an account of at least one guest, based on an invitation and/or change performed by the host with respect to the schedule. For example, when the schedule is edited using an interface for editing the schedule which depends on the account of the host, the server may synchronize the edited schedule with at least one schedule which depends on an account of at least one guest. According to an embodiment, the server may notify a terminal of the guest of an invitation and/or change performed for the schedule, using the schedule notification 140.

Furthermore, according to an embodiment, when a guest does not input a response to a registered schedule during a predetermined time, when a specified date in the registered schedule elapses, or when the guest provides the input that he or she does not register the schedule, the registered schedule may be deleted. According to an embodiment, when the guest declines to participate in the schedule, a schedule registered with a personal calendar of the guest may be deleted.

A user (e.g., a host and/or a guest) may set a pre-notification of a schedule. For example, a setting is possible about the pre-notification for each user. Based on the pre-notification set by the user, the server may notify a terminal of the user of a schedule using the schedule notification 140. In this case, a description will be given below of an embodiment of a screen provided to the terminal of the user. According to an embodiment, a pre-notification of a schedule may be automatically set without the setting of the guest.

According to an embodiment, a pre-notification function may operate as follows.

Setting a default pre-notification: a value set by a host who generates a schedule is applied to all who share the schedule. Thereafter, correction/deletion is stored by a setting for each individual.

A maximum number of pre-notifications: a predetermined number of cases (e.g., a maximum number of 2 cases) for each schedule, including a pre-notification set by the host, are possible.

Editing a notification: a value set by the host may be deleted/corrected and is reflected in only oneself.

A guest invited in the middle follows a pre-notification setting of the host.

According to an embodiment, although the schedule generation 110 is requested through the general chat room 102, at least some of users who are participating in the chat room may fail to be invited to a corresponding schedule. In other words, the right to access the schedule may be assigned by an invitation to the schedule and acceptance of the invitation without respect to a chat room requested to generate the schedule.

Hereinafter, terms used in the specification may be arranged as Table 1 below.

TABLE 1

| Classification | | Description |
| --- | --- | --- |
| Calendar | | Space where all my schedules are managed and seen at a glance |
| Schedule | | Separate event where a date, a time, a place, and an invitee are designated |
| Owner | Host | Person who generates a schedule |
| | Guest | Person invited to a schedule |
| Right | Host | Invitation/change/deletion for a schedule which depends on accounts of a host and a guest |
| | Guest | Edit a part of a schedule which depends on an account of the guest oneself |
| Invite | | Action of requesting to attend a schedule |
| Participation State | Accept | Indicate an intention to participate in a schedule |
| | Decline | Indicate an intention not to participate in a schedule |
| | Undecided | State where participation in a schedule is not decided yet |
| Share | | Send a schedule to a specific friend or chat room without regard to whether to invite him or her |

Herein, the 'owner' may refer to a user who may allow a schedule to depend on his or her own calendar and may change the schedule. The right of a host to a first schedule generated by a schedule generation request may differ from the right of a guest to a second schedule generated by a schedule invitation.

According to an embodiment, the right to write a schedule may vary with a writer of the schedule and a type of a chat room as Table 2 below.

TABLE 2

| Classification of chat room | Writing right |
|---|---|
| Chat room with me | Corresponding user |
| General chat room | All of participants |
| Open chat room | All of participants (or a room manager) |
| Chat room for official account | User of corresponding official account |

Furthermore, according to an embodiment, the host may have an edit right, associated with all of schedules which depend on an account of the host, for example, to edit a schedule, delete the schedule, invite a guest to the schedule, and set a pre-notification. In contrast, the guest may have only a part of an edit right to a schedule which depends on an account of oneself (the guest) and does not have the right to invite another guest to the schedule. For example, the guest may edit only a title of a schedule or only a description of the schedule. Although the schedule of the guest is edited, the edited schedule of the guest is not synchronized with a schedule of the host and a schedule of another guest.

According to an embodiment, whether to receive a notification for each attendance state of the host and/or the guest may be set as Table 3 below.

TABLE 3

| Classification of notification | Not respond | Attend | Not attend | Maybe | Path of notification |
|---|---|---|---|---|---|
| Pre-notification | ○ | ○ | X | ○ | Official account |
| Schedule correction | ○ | ○ | ○ | ○ | Official account |
| Schedule deletion | ○ | ○ | ○ | ○ | Official account |

The schedule correction may include a correction of an invitee, an attendee, a date, and/or a place.

According to an embodiment, an invitation for a specific member (guest) is excluded by an edit, a notification may be received as Table 4 below.

TABLE 4

| State of corresponding member | Whether to receive | Notification path | Notification type |
|---|---|---|---|
| Attend/maybe/not respond | ○ | Official account | Delete notification |
| Not attend | X | N/A | N/A |

A type of the delete notification may include a type, for example, "the schedule is cancelled".

According to an embodiment, it may operate as Table 5 below in a withdrawal scenario.

TABLE 5

| Situation | Classification | Detailed specifications |
|---|---|---|
| Withdraw from an instant messenger (Delete an instant messenger) | Oneself | All of schedule related data are deleted. A schedule service is unavailable. Herein, a schedule service based on an account is available. |
| | Guest | When an account remains, a profile photo (a default image if there is no profile photo) and a name which are registered with the account are exposed and dimmed. When an account switches to a dormant account, guest information is indicated as being 'unknown'. When there is no account, the guest is deleted from an invited member list. |
| | Host | When an account remains, a profile photo (a default image if there is no profile photo) and a name which are registered with the account are exposed and dimmed. When an account switches to a dormant account, host information is indicated as being 'unknown'. Although there is no account, a schedule remains, and host information is indicated as being 'unknown'. |
| Account withdrawal of instant messaging service | Oneself | A schedule service is unavailable. When joined again, a new calendar is generated. |
| | Guest | The guest is deleted from an invited member list. |
| | Host | A schedule remains, and host information is indicated as being 'unknown'. |

The withdrawal from the instant messenger may include a scenario of deleting the instant messenger.

Figure 2:
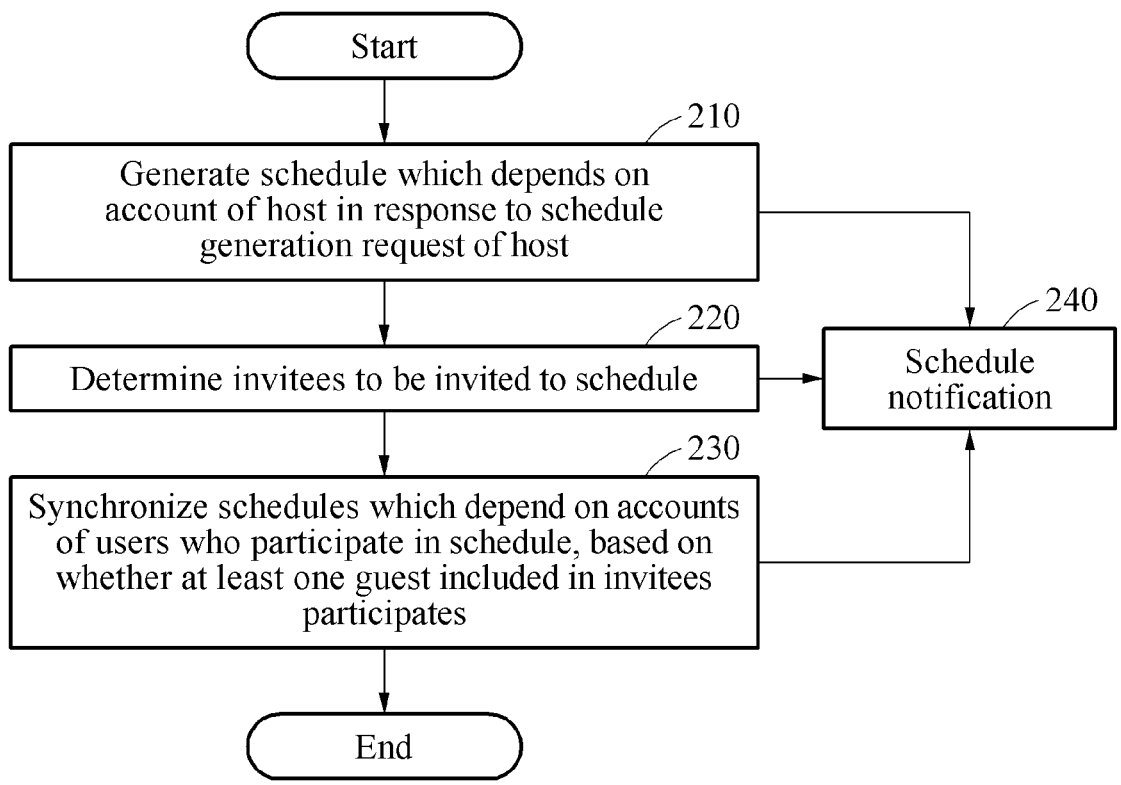
FIG. 2 is a flowchart illustrating an operation method of an instant messenger server which provides a schedule service according to an embodiment.

FIG. 2 is a flowchart illustrating an operation method of an instant messenger server which provides a schedule service according to an embodiment. Referring to FIG. 2, in operation 210, an instant messenger server (hereinafter referred to as "server") may generate a schedule which depends on an account of a host in response to a schedule generation request of the host. In this case, the schedule which depends on the account of the host may be displayed as, for example, a screen shown in FIG. 3. When the schedule is generated, the server may transmit a message for providing a notification that the schedule is generated to a to terminal of the host through a dedicated chat room for an official account of a schedule service to notify the terminal of the host that the schedule is generated.

In operation 220, the server may receive invitees to be invited to the schedule and may receive whether to participate in the schedule from at least one guest included in the invitees based on the invitees. The server may receive information about an invitee invited based on a chat room list of an account of the host and/or a friend list of the account of the host on an instant messaging service via the terminal of the host. The information about the invitee may include information about a chat room (e.g., an identifier of the chat room, an identifier of a participant who participates in the chat room, or the like) or an identifier of a separate user.

A description will be given of the process where the server receives the invitees with reference to, for example, FIG. 4. According to an embodiment, an invitee may be automatically input in the terminal of the host. For example, when the schedule generation request of the host is generated through a specific chat room, users who are participating in the chat room may be automatically input as invitees. The host may edit invitees who are automatically input.

The server may transmit a message to a terminal of a guest determined as the invitee through the dedicated chat room for the official account of the schedule service to notify the guest that the guest is invited to the schedule. The server may receive whether the guest who receives the invitation notification message participates in the schedule from the guest who receives the invitation notification message. A description will be given in detail of the method where the server receives whether the guest participates in the schedule from the guest with reference to FIG. 6.

The server may update participant information included in the schedule, based on whether at least one guest participates. The server may notify the terminal of the host that the participant information is changed, through the official account of the schedule service based on the updated participant information.

In operation 230, the server may synchronize a schedule which depends on an account of the host with schedules which depend on accounts of users which participant in the schedule, based on the updated participant information. As the guest selects that he or she participates in the schedule, when a schedule which depends on an account of the guest is generated, in operation 240, an invitation and/or change notification performed for the schedule by the host may be provided to a user terminal through the official account of the schedule service.

Figure 3:
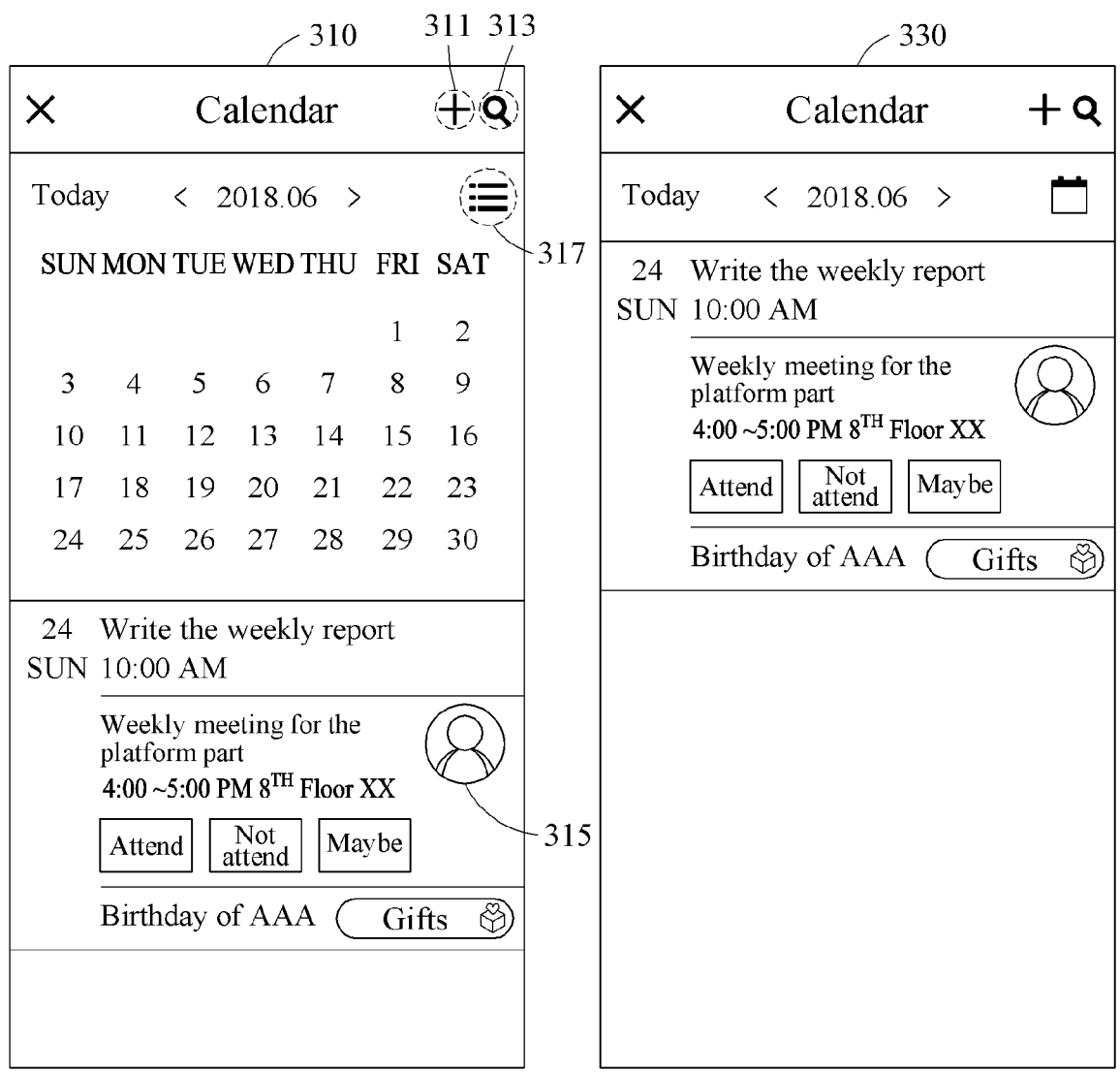
FIG. 3 is a drawing illustrating a screen of a calendar on which a schedule is displayed, according to an embodiment.

FIG. 3 is a drawing illustrating a screen of a calendar on which a schedule is displayed, according to an embodiment. Referring to FIG. 3, according to an embodiment, a monthly view screen 310 of a calendar on which a schedule which depends on an account of a host is displayed on a monthly basis and a list view screen 330 on which only a schedule list included in the monthly view screen 310 is displayed are shown.

For example, a month (June) corresponding to today (Jun. 24, 2018) may be displayed on an upper end of the monthly view screen 310 in the form of a calendar. Furthermore, a schedule list corresponding to today or a date selected by a user may be displayed on a lower end of the monthly view screen 310. A mark such as • may be displayed under a date when there is a schedule on the monthly view screen 310. For example, when there is no schedule corresponding to today or a date selected by the user, the sentence "There is no schedule." may be displayed.

The schedule list may include information such as a title (e.g., 'write the weekly report', 'weekly meeting for the platform part', or the like), a start date and time, an end date and time, and a place of each schedule. In this case, buttons (e.g., an 'attend' button, a 'not attend' button, and a 'maybe' button) capable of selecting whether the user participates may be displayed together on a list of schedules. Furthermore, profile information including a profile photo 315 of a corresponding schedule may be displayed on the schedule list.

The monthly view screen 310 may include an icon 311 for writing a schedule, an icon 313 for searching for a calendar, and/or an icon 317 for converting a calendar view mode.

When the user (e.g., the host) selects the icon 311, a writing form (see a screen 410 of FIG. 4) for writing a schedule may be displayed on a terminal of the user. The user may enter a title of the schedule in the writing form and may set a start date and time and an end date and time of the schedule. When the user taps on a place field included in the writing form, a user interface screen for a place search may be provided.

Furthermore, as the user selects a pre-notification setting item of the schedule included in the writing form, he or she may set a pre-notification time for the schedule, for example, a notification before 5 minutes, a notification before 15 minutes, or a notification before 1 day. The pre-notification may be set for a plurality of time zones.

In addition, an icon (not shown) for repetition setting may be included in the writing form. As the user selects the icon for repetition setting, he or she may repeatedly set the schedule at a period, for example, every day, every week, every month, or every year.

When the user (e.g., the host) selects the icon 313, a calendar search menu may be displayed on a terminal of the user. When the user selects the icon 317, a calendar displayed on the monthly view screen 310 may be folded and only a schedule list may be displayed as the list view screen 330.

Figure 4:
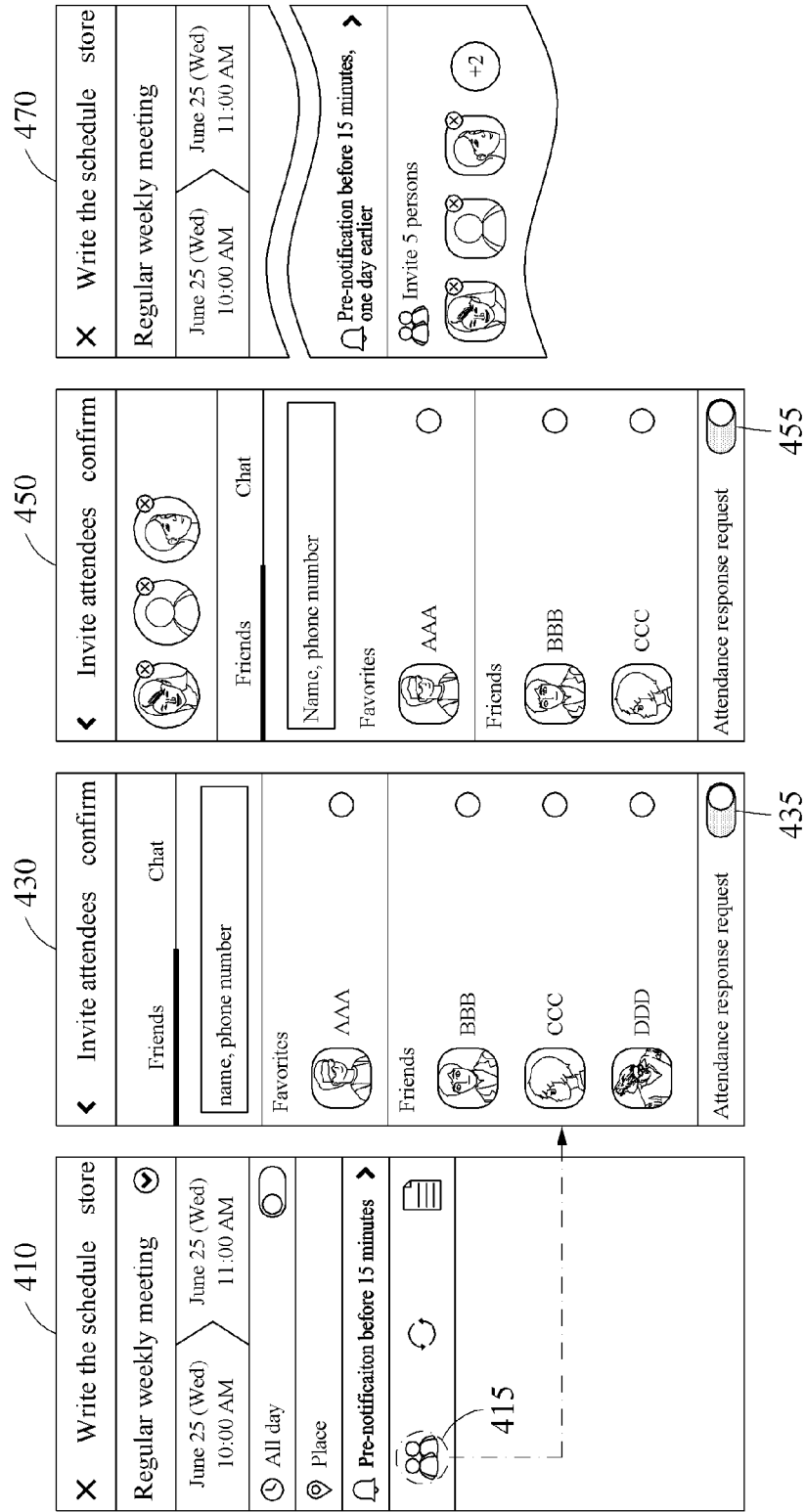
FIG. 4 is a drawing illustrating a method for receiving an invitee to be invited to a schedule according to an embodiment.

FIG. 4 is a drawing illustrating a method for receiving an invitee to be invited to a schedule according to an embodiment. Referring to FIG. 4, a screen 410 indicating a writing form for schedule writing of a host, an entrance screen 430 for an invitation when a schedule generation request of the host is generated through a calendar of the host, an entrance screen 450 for an invitation when the schedule generation request of the host is generated through a specific chat room, and a screen 470 where an input to an invitee is completed are shown.

According to an embodiment, the host may select an invitation icon 415 included in the screen 410 to input an invitee to be invited to a schedule. In this case, the invitee may be a separate user or may be a specific chat room.

For example, when the schedule generation request of the host is generated through the calendar of the host, the screen 430 may be displayed on a terminal of the host. The host may select an invitee to be invited to the schedule among separate users displayed on the screen 430. When the schedule generation request of the host is generated through the specific chat room, the screen 450 may be displayed on the terminal of the host. The host may select an invitee to be invited to the schedule among users who are participating in the chat room displayed on the screen 450. When the schedule generation request of the host is generated through the specific chat room like the screen 450, the terminal of the host may automatically input users who are participating in the chat room as invitees to be invited to a schedule which depends on an account of the host.

When the selection of the invitee is completed through the screen 430 and/or the screen 450, the finally selected invitees may be displayed as the screen 470. For example, when invitees are greater than or equal to 3 or 5 persons, the number of invitees which is greater than 3 or 5 persons may be displayed together with the '+' indication. When the '+' is selected, while invitees, the indication of which is omitted, are displayed, an interface for searching for the invitees using scrolling may be provided. Alternatively, when the '+' is selected, a separate interface for displaying invitees at the same time may be provided.

Figure 5:
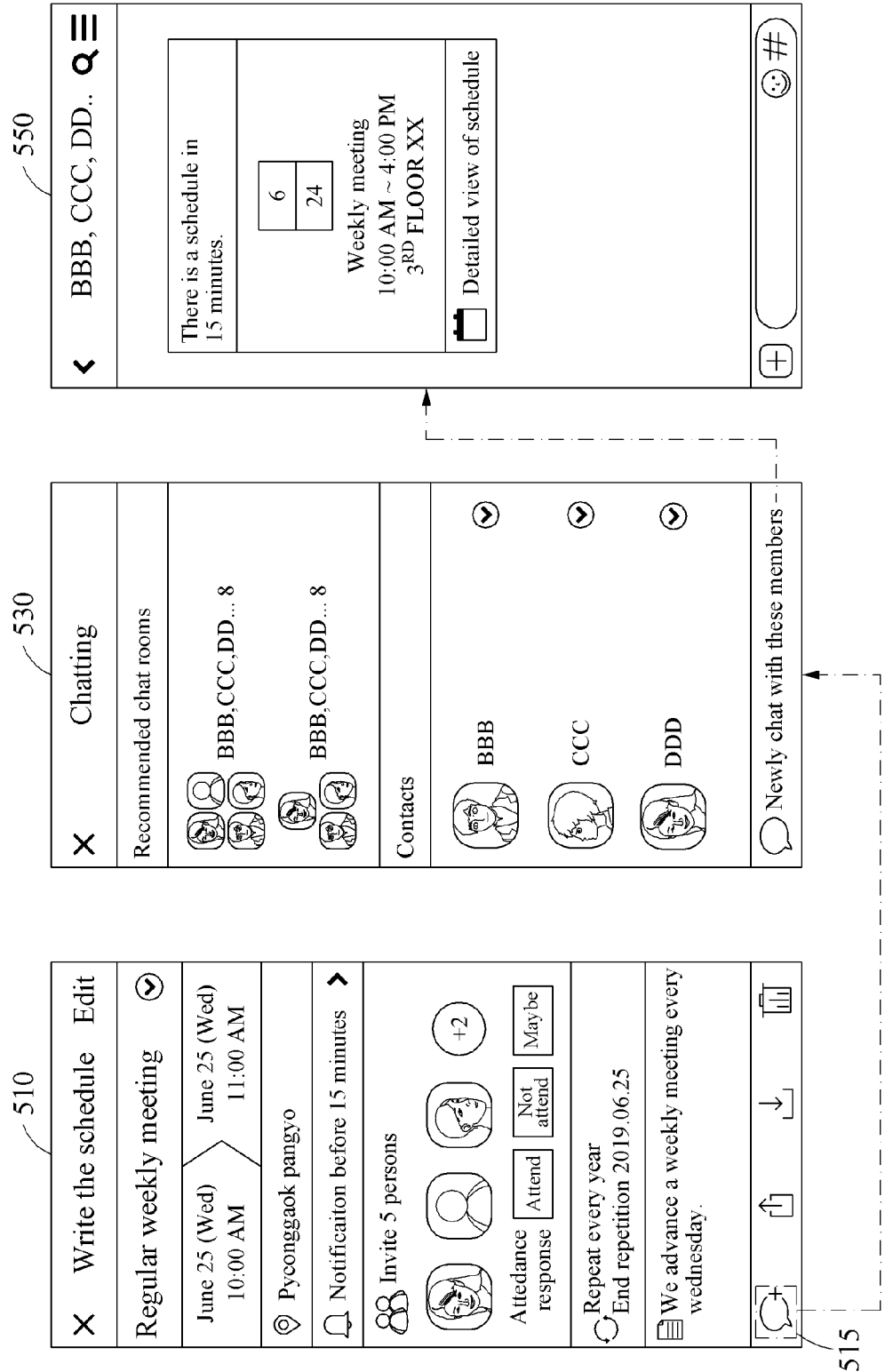
FIG. 5 is a drawing illustrating a method for requesting to chat with a target to participate in a schedule, according to an embodiment.

FIG. 5 is a drawing illustrating a method for requesting to chat with a target to participate in a schedule, according to an embodiment. Referring to FIG. 5, a screen 510 for a detailed view of a schedule, a screen 530 for requesting to chat with a target who participates in the schedule, and a screen 550 where a schedule preview is displayed on the chat room in the form of a message are shown. The message may be provided in the form of a system message as shown on the screen 550 or may be provided in the form of a speech balloon of which a sender is set to an official account of a schedule service.

For example, when invitees of the schedule is designated as 5 persons like the screen 510, a host may select a chat icon 515 included in the screen 510. A server may provide (or recommend) candidate chat rooms based on participants information including the host and guests who accept an invitation of the schedule, in response to a chat request. In this case, the candidate chat rooms may be chat rooms in which 5 users are participating.

According to an embodiment, an order where chat rooms are recommended may be set in various manners. For example, an order where chat rooms are recommended may be set, for example, i) chat rooms in which only the invitees (e.g., 5 persons) participates are first arranged, ii) a chat room in which the latest message is transmitted and received among the chat rooms including the invitees (e.g., the 5 persons) is arranged, and iii) chat rooms including only attendees (e.g., persons who indicates attendance among the invitees) are first arranged.

Alternatively, when the host selects the chat icon 515 included in the screen 510, the server may generate a new chat room based on participant information in response to a chat request. For example, a new chat room configured with targets who participates in the schedule may be generated.

Figure 6:
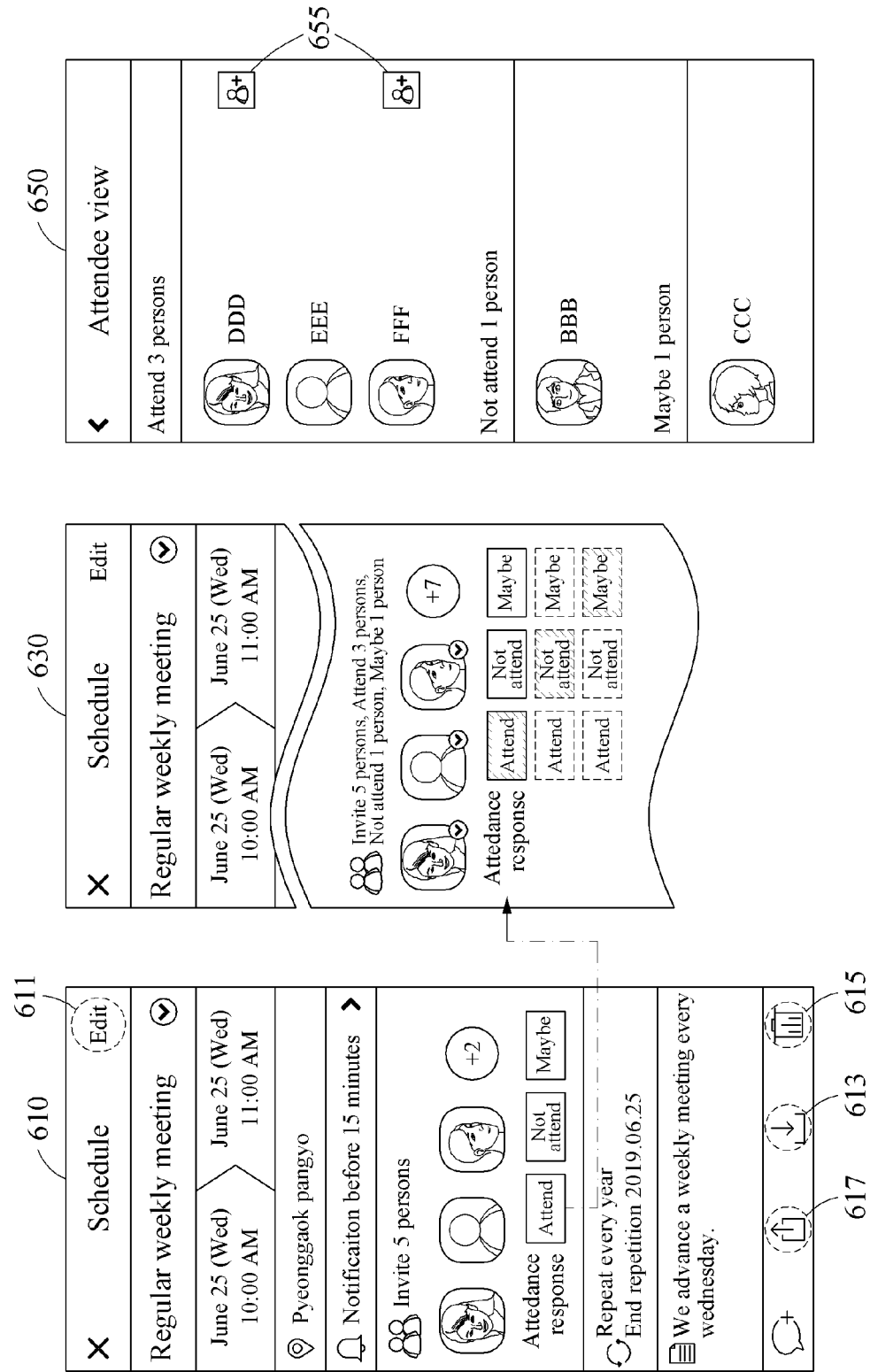
FIG. 6 is a drawing illustrating a method for receiving whether to participate in a schedule, according to an embodiment.

FIG. 6 is a drawing illustrating a method for receiving whether to participate in a schedule, according to an embodiment. Referring to FIG. 6, according to an embodiment, a screen 610 for a detailed view of a schedule, a screen 630 for displaying responses to whether to participate in the schedule, and a screen 650 for a detailed view of a participant are shown.

When a user selects an edit button 611 included in the screen 610, an edit menu for editing associated with the schedule may be displayed on a screen of the user.

According to an embodiment, the range of permission for correction for each field of the schedule and a reflection target may be determined as Table 6 below depending on whether an owner of the schedule is any of a host and a guest.

TABLE 6

| Field | Host | | Guest | |
| --- | --- | --- | --- | --- |
| | Permission for correction | Reflection target | Permission for correction | Reflection target |
| Title | ○ | All | ○ | Oneself |
| Start date and time | ○ | All | X | N/A |
| End date and time | ○ | All | X | N/A |
| All day | ○ | All | X | N/A |
| Lunar calendar | ○ | All | X | N/A |
| Place | ○ | All | X | N/A |
| Notification | ○ | All | ○ | Oneself |
| Request to respond for attendance | ○ | All | X | N/A |
| Repetition | ○ | All | X | N/A |
| Description | ○ | All | ○ | Oneself |
| Invitation | ○ | All | X | N/A |

The host may correct and/or delete all fields of the schedule. The schedule corrected and/or deleted by the host may be reflected in a schedule of all of participants including the host and a guest. For example, when the host cancels an invitation to a schedule with respect to the guest, a server may notify the guest that the schedule is cancelled. When the host edits the schedule and stores the edited schedule, a confirmation pop-up "A response for attendance is initiated if you correct your schedule and a schedule change notification is sent. Do you correct your schedule?" may be displayed on a screen of the host.

In contrast, the guest may only correct some fields. For example, the guest may correct title, notification, and description fields of the schedule. The schedule corrected by the guest may be reflected in only a schedule which depends on an account of oneself (the guest). For example, when the guest edits the schedule and stores the edited schedule, a confirmation pop-up "The corrected contents are reflected in only my calendar." may be displayed on a screen of the guest.

Buttons (e.g., an "attend" button, a "not attend" button, and/or a "maybe" button) capable of displaying an attendance response to a schedule to which the user is invited may be displayed. The user may change a state value (e.g., "attend", "not attend", or "maybe") for an attendance response is ended before the schedule. In this case, irrespective of whether the user responds, the schedule may be displayed on a calendar. When the user selects a download icon 613 displayed on the screen 610, the schedule to which the user is invited may be stored in a default calendar of a terminal of the user. Furthermore, when the user selects a delete icon 615 displayed on the screen 610, the schedule to which the user is invited may be deleted. In this case, when the user is a host, as the schedule is deleted, a notification that the schedule is cancelled may be provided to participants. Furthermore, when the user is a guest, as the schedule is deleted, the schedule may be removed from only a guest's own calendar.

When the user selects a schedule sharing icon 617 displayed on the screen 610, he or she may share the schedule with a chat room. The user may select the schedule sharing icon 617 to share the schedule with a participant who is not invited.

When the user responds for attendance on the screen 610, a selected button interface may be displayed differently from another button interface which is not selected as shown on the screen 630. According to a response of at least one user included in invitees, the number of persons who select "attend/not attend/maybe" may be displayed on the screen 630. In this case, a guest who does not respond may be counted as selecting "maybe".

When whether to attend the schedule is finally determined, the user may identify detailed information about participants through the screen 650. The number of participants and profile information of each of the participants may be displayed for each type of the attendance response. In this case, a friend add button 655 may be displayed together with a participant who is not a friend among the participants.

Figure 7:
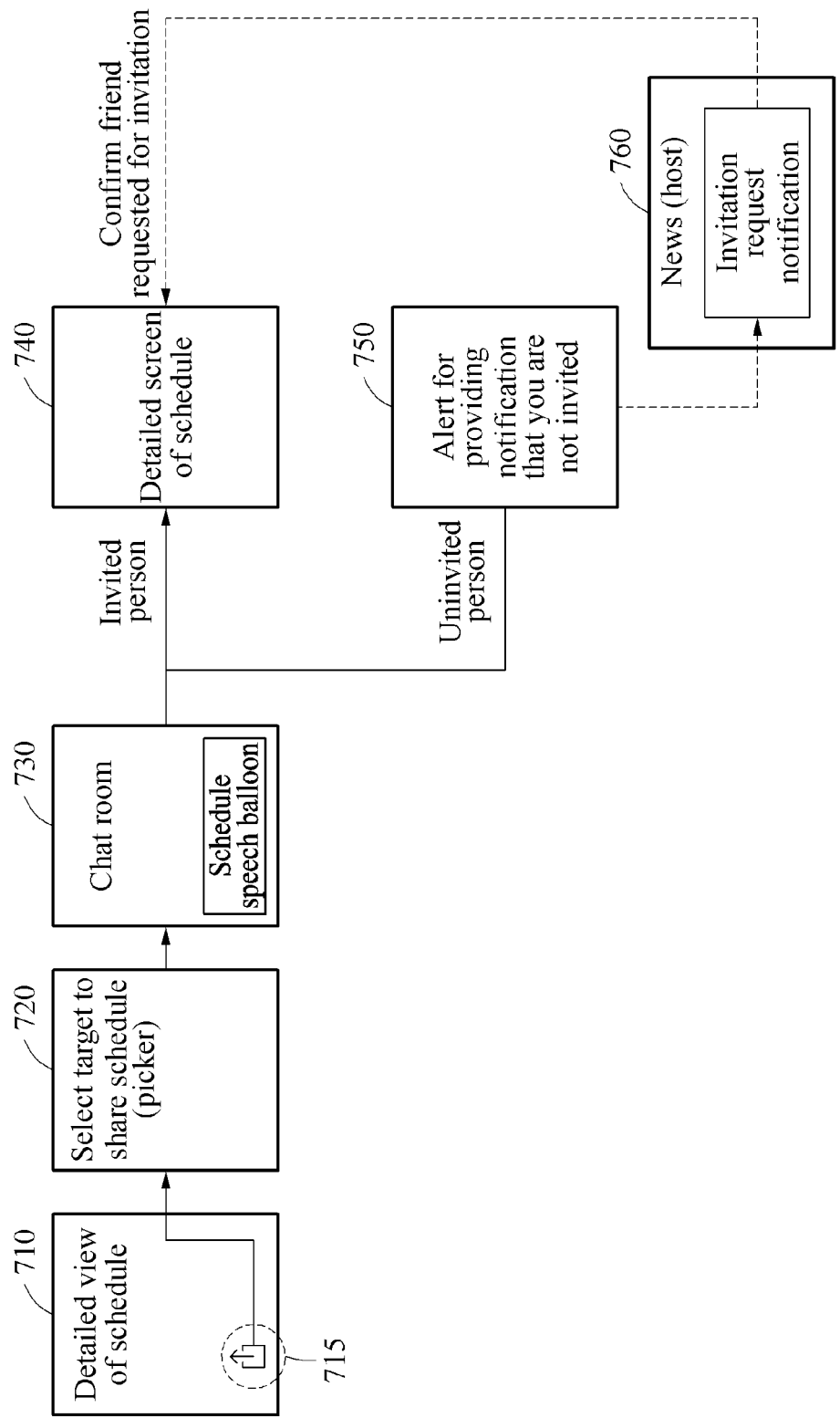
FIG. 7 is a drawing illustrating a process where a host shares a schedule with participants, according to an embodiment.

FIG. 7 is a drawing illustrating a process where a host shares a schedule with participants, according to an embodiment. Referring to FIG. 7, according to an embodiment, a process where user X (e.g., a host) selects a schedule sharing icon 715 included in a screen 710 for a detailed view of a schedule and shares the schedule is shown. As described above, user X may select the schedule sharing icon 715 to select a target to share the schedule (see reference numeral 720). The target to share the schedule may be a separate user or a chat room. When the selection of the target to share the schedule is completed, a schedule speech balloon may be transmitted to a chat room 730 (e.g., a 1:1 chat room or a group chat room) of the selected target. In this case, when the schedule speed balloon is selected on a terminal of user Y who corresponds to an invitee among users of a chat room with which the schedule is shared, a detailed screen 740 of the schedule may be displayed.

Furthermore, an alert 750 for providing a notification that you are not invited, for example, "You are not a member who is not invited to the schedule.", may be displayed on a terminal of user Z who does not correspond to an invitee among the users of the chat room with which the schedule is shared. In this case, user Z who does not correspond to the invitee may transmit an invitation request for requesting user X who selects to share the schedule to invite user Z to the schedule. The invitation request of user Z may be displayed as an invitation request notification on news of user X (see reference numeral 760). According to an embodiment, the invitation request message may be transmitted to a chat room in which the host is participating. Although not illustrated in the drawing, the alert for providing the notification that you are not invited, denoted by reference numeral 750, and/or the invitation request notification denoted by reference numeral 760 may be provided through a dedicated chat room for an official account of a schedule service.

A server may receive whether to accept an invitation request from user X and may update participant information included in the schedule, based on whether user X accepts the invitation request. As the participant information is updated, user Z may be confirmed as an invitation request friend. Thus, the detailed screen 740 of the schedule may be displayed on a terminal of user Z. When the participant information is updated, schedules of the host and a guest may be synchronized with each other.

Figure 8:
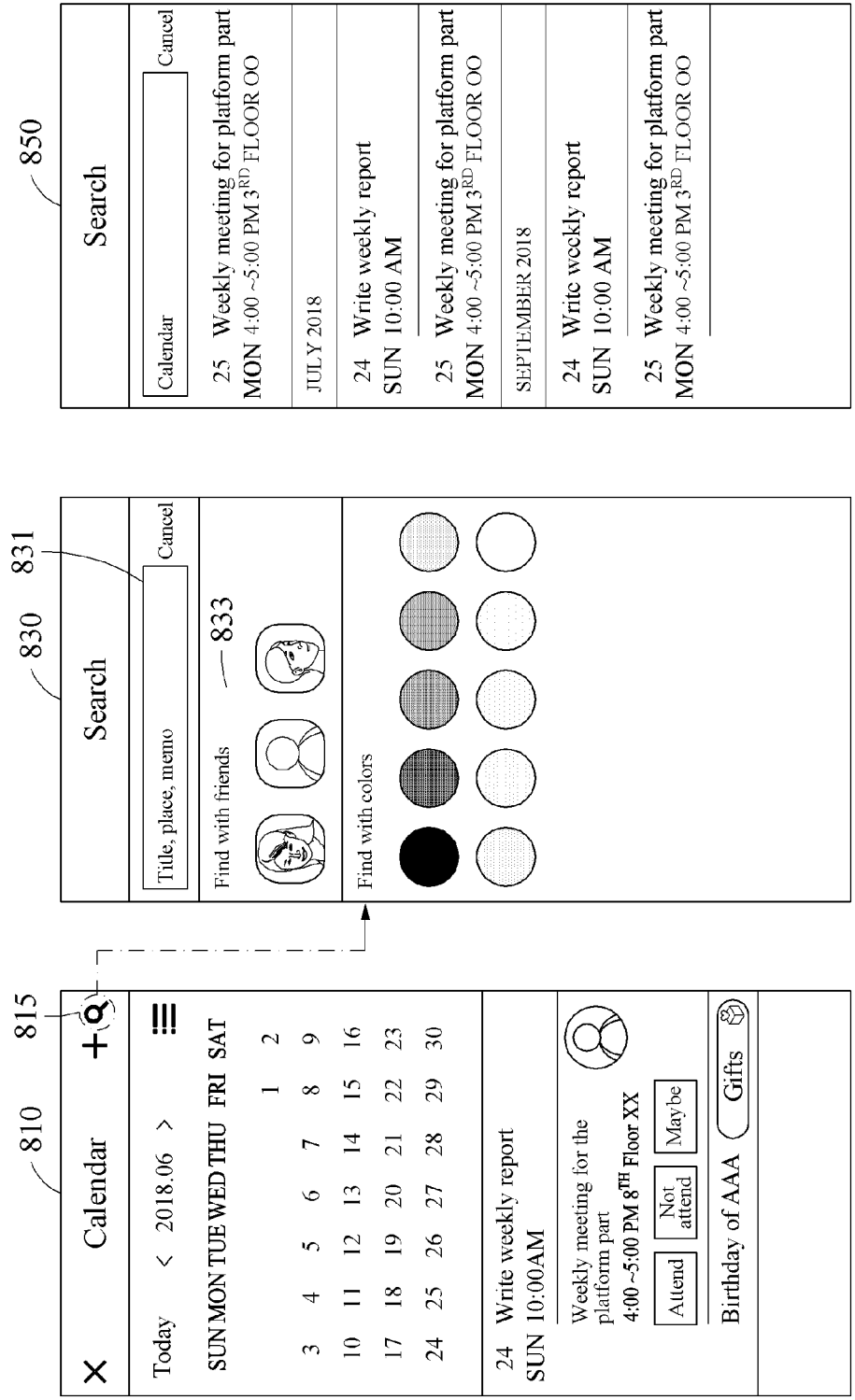
FIG. 8 is a drawing illustrating a method for providing at least one schedule corresponding to information about a participant requested for a search, according to an embodiment.

FIG. 8 is a drawing illustrating a method for providing at least one schedule corresponding to information about a participant requested for a search, according to an embodiment. Referring to FIG. 8, an entrance screen 810 for searching for a schedule, a screen 830 indicating a search page, and a screen 850 indicating a search result are shown.

When a user selects a search icon 815 included in the entrance screen 810, a search page like the screen 830 may be provided. The search page like the screen 830 may include a search window 831 for entering a search target, for example, a title, a place, a memo, or an invited member name. Furthermore, the search page may include a 'find with friends' item 833. In this case, the 'find with friends' item 833 may perform a function of searching for a schedule including a host of the schedule and/or a participant of the schedule.

For example, when receiving a search request based on information about participants (e.g., participants B, C, and D) from specific user A, a server may extract and provide at least one schedule corresponding to the information about the participants requested for a search among a plurality of schedules which depend on an account of specific user A. When there are 5 recent schedules corresponding to participants B, C, and D, the server may provide the 5 schedules as searched results. According to an embodiment, when each schedule is distinguished for each color, the server may filter schedules for each specified color to search for schedules.

The final result of searching for the schedules may be provided in the form of a list classified on a monthly basis. The at least one schedule corresponding to the information about the participants requested for the search may include information, for example, a month, a date, weather, a day, a title, a time, and a place. The found schedules may be arranged and displayed sequentially or in a reverse order on the basis of a schedule which is closest to today.

Figure 9:
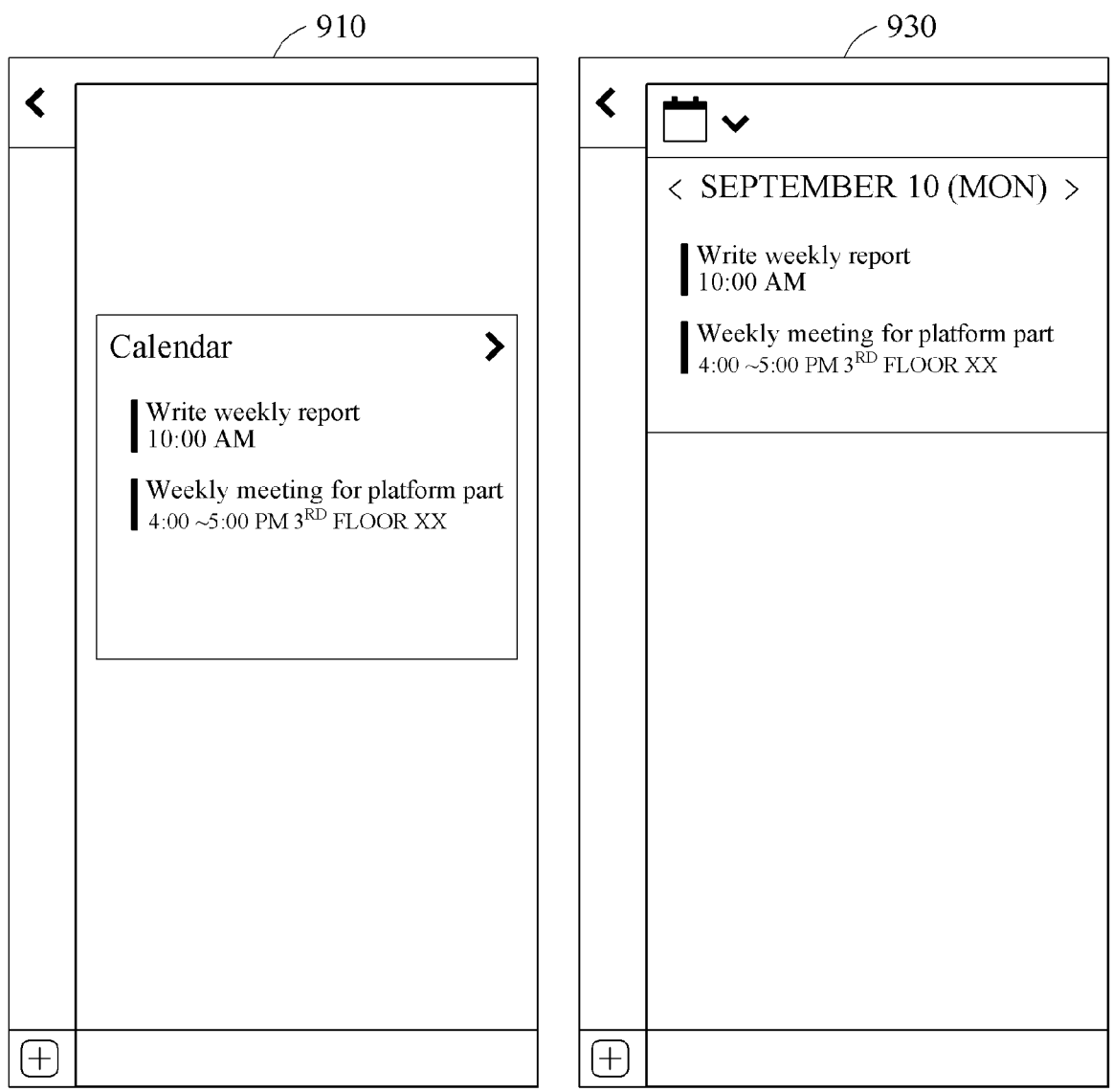
FIG. 9 is a drawing illustrating a method for previewing a schedule according to an embodiment.

FIG. 9 is a drawing illustrating a method for previewing a schedule according to an embodiment. Referring to FIG. 9, according to an embodiment, a schedule preview screen 910 displayed on a chat room with me and a schedule preview screen 930 displayed on a general chat room are shown.

For example, when a user who participates in a specific chat room requests to preview a schedule, a server may access a schedule which depends on an account of the user to provide the schedule preview screens 910 and 930. In this case, the server may provide an interface for searching for the schedule which depends on the account of the user.

A function of previewing a recent schedule (e.g., today's schedule) of the user may be provided on the schedule preview screen 910, and a function of quickly searching for a schedule of the user (e.g., searching for the schedule of the user for each date) may be provided on the schedule preview screen 930.

Alternatively, when a schedule preview is requested through a general chat room, a schedule preview view for displaying a schedule, associated with the chat room (e.g., a schedule to which the chat room is tagged, a schedule associated with a member who is participating in the chat room, or the like), among schedules which depends on the user, earlier than another schedule, may be provided.

Figure 10:
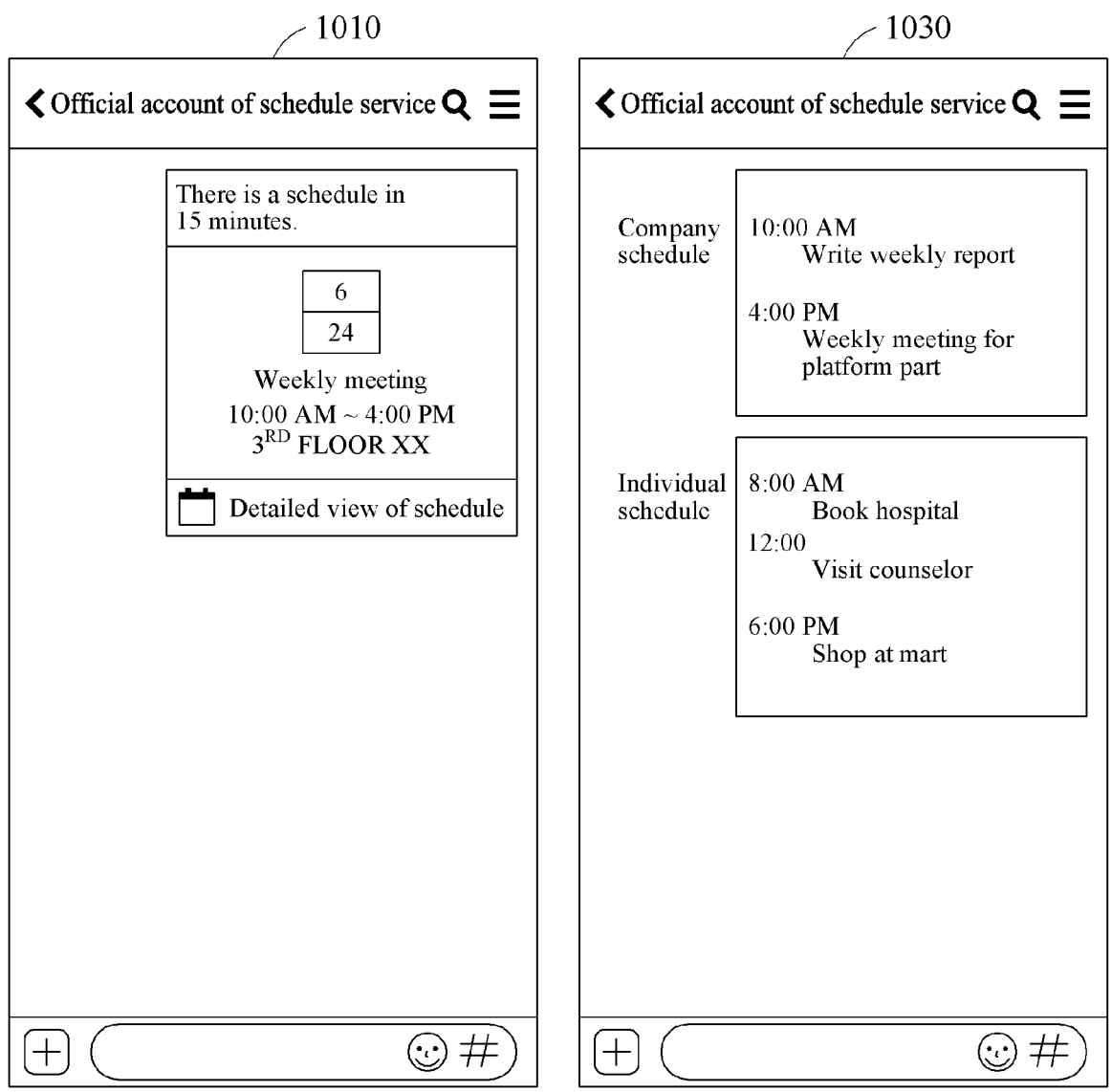
FIG. 10 is a drawing illustrating a screen for providing a pre-notification of a schedule according to an embodiment.

FIG. 10 is a drawing illustrating a screen for providing a pre-notification of a schedule according to an embodiment. Referring to FIG. 10, pre-notification screens 1010 and 1030 displayed in various forms on a chat room are shown.

According to an embodiment, a user may set a pre-notification of a schedule through a dedicated chat room for an official account of a schedule service and/or a general chat room. When the user sets the pre-notification of the schedule, the pre-notification screen 1010 including pre-notification information, for example, a pre-notification time guidance sentence ("There are a schedule in 15 minutes."), a schedule start month/day, a schedule title, a schedule start to end time, a place, or a button for entering a screen for a detailed view of the schedule, may be displayed on a terminal of the user.

According to an embodiment, the schedule may be classified for each type of the schedule, for example, a company schedule and an individual schedule, and may be displayed on the pre-notification screen 1030.

Figure 11:
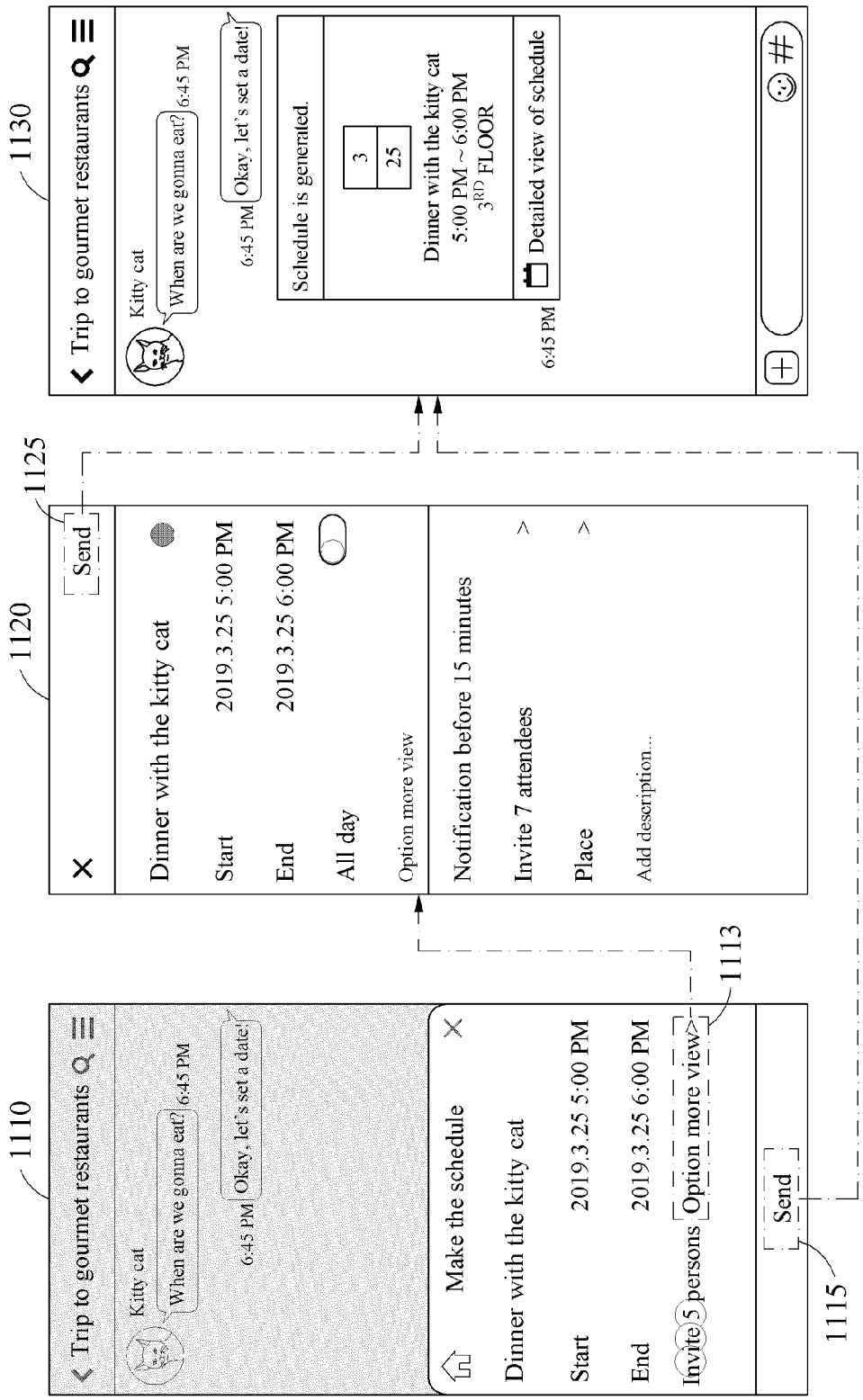
FIG. 11 is a drawing illustrating a quick writing screen according to an embodiment.

FIG. 11 is a drawing illustrating a quick writing screen according to an embodiment. Referring to FIG. 11, according to an embodiment, the following scenarios may be served through a plus menu.

Referring to a screen 1110 according to an embodiment, quick writing is a function of automatically setting information necessary to generate a schedule using information of a chat room, when it is requested to generate the schedule or whether to change all schedules may be exposed. The exposed option may be changed according to whether the user is the host or a guest.

Furthermore, when a schedule deletion request 1231 is input on the detailed screen 1210 of the schedule, in operation 1232, it may be determined whether a user who provides the schedule deletion request 1231 is a host. In operation 1233, it may be determined whether the schedule is a repeated schedule. According to whether the user is the host and whether the schedule is the repeated schedule, in operation 1234, an option of selecting whether delete only the schedule, whether to delete all schedules after the schedule, or whether to delete all schedules may be exposed.

According to an embodiment, the processing of the repeated schedule may be designed as Table 7 below.

TABLE 7

| Classification | Host | Guest |
| --- | --- | --- |
| Edit | All fields may be corrected. After whether to attend the schedule is reset when a time is changed, a change notification is transmitted. Only the schedule may be corrected, all schedules after the schedule may be corrected, or all schedules may be corrected. | Only notification and memo fields may be corrected. It is applied to only guest's own schedule. All schedules may be corrected. |
| Delete | After schedules of a host and a guest are deleted, a deletion notification is transmitted. Only the schedule may be deleted, all schedules after the schedule are deleted, or all schedules are deleted. | After only guest's own schedule is detected, it is indicated not to attend the schedule. Only the schedule may be deleted or all schedules may be deleted. |
| Whether to attend the schedule | Whether to attend only the schedule is set or whether to attend all schedules is set. | Whether to attend only the schedule is set or whether to attend all schedules is set. | through a plus menu of the chat room in which the host participates. For example, a title, a date, a time, a notification before 15 minutes, an attendee, and the like may be automatically set using the quick writing.

When an option more view 1113 is selected on the screen 1110, while including information automatically set using the quick writing function, a writing page 1120 in a state where the option more view is folded may be provided. The automatically set information may be corrected on the writing page 1120, or information which is not automatically set may be additionally set on the writing page 1120.

When a send 1115 is selected on the screen 1110 or when a send 1125 is selected on the written page 1120, a schedule may be shared with the chat room. The shared schedule may be provided to the chat room in various forms, for example, in the form of a system message, in the form of a speech balloon, according to an embodiment.

Figure 12:
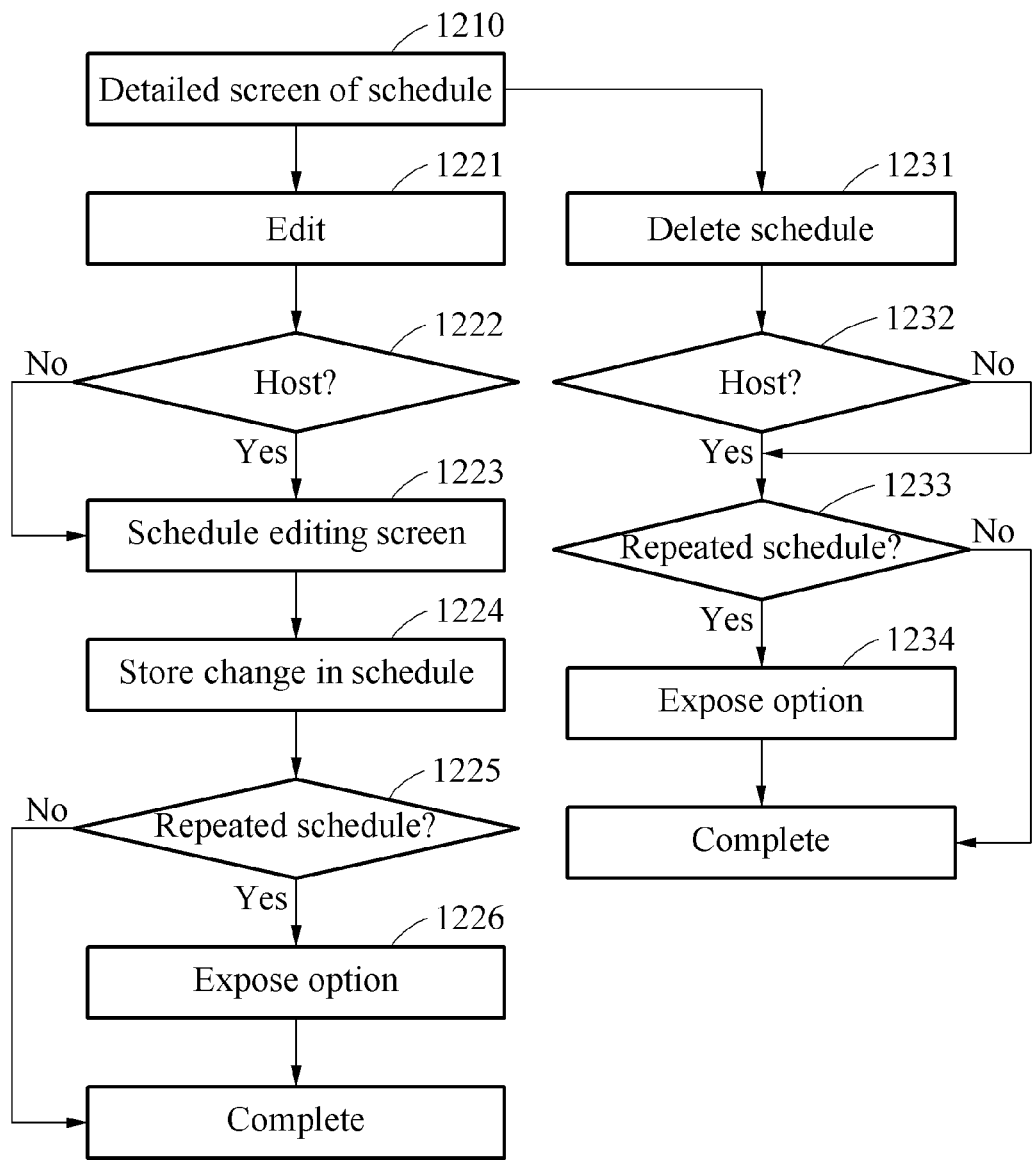
FIG. 12 is an operational flowchart illustrating a repeated schedule according to an embodiment.

FIG. 12 is an operational flowchart illustrating a repeated schedule according to an embodiment. Referring to FIG. 12, according to an embodiment, when an edit request 1221 is input on a detailed screen 1210 of a schedule, in operation 1222, it may be determined whether a user who provides the edit request 1221 is a host. A field capable of being edited on a schedule editing screen 1223 may be changed according to whether the user is the host. When a request 1224 to store a change in schedule is input, in operation 1225, it may be determined whether the schedule is a repeated schedule. When the schedule is the repeated schedule, in operation 1226, an option of selecting whether to change only the schedule, whether to change all schedules after the schedule, According to an embodiment, when a repeated option is turned off on a specific schedule, only the schedule may remain and all the other schedules may be deleted.

After a time is changed on the specific schedule, when 'a change of all schedules' is selected, a time of a partially corrected schedule may be collectively changed. After the time is changed on the specific schedule, when 'a change of only the schedule' is selected, 'the change of only the schedule' may be selected on the schedule. For a color field, a pre-notification field, and a memo field, it may be designed to be able to select only 'a change of all schedules' in both of a host and a guest. When a repeated period field, a repeated end date field, and an all day option field are changed, it may be designed to be unable to select 'correction of only the schedule'.

When a notification field and an all day option field are changed in an edit screen, the following processing maybe performed. For example, when a time schedule is set to '1 hour before notification', when a notification is changed to 'before 30 minutes', and when an all day option is turned on, for example, when the all day option is automatically changed to an all day schedule default notification, the all day option may be turned off. In this case, it may be set to '1 hour before original notification of the repeated schedule'.

A lunar calendar option on the edit screen may be designed to be unable to be changed. In this case, the lunar calendar option may fail to be exposed as an edit item. Furthermore, when a middle date of a repeated schedule is designated to correct a start date, it may be designed not to automatically extend a maximum value of a repeated end date on the edit screen. For example, in a schedule repeated every day, which starts on January 1 and is ended in 2 years, although February 1 is designated to correct a start date, a maximum value of an original repeated end date may remain without being extended automatically. On the other hand, when a schedule is separated by 'correction of all schedules after the schedule', a maximum value of a repeated end date may be automatically extended.

Figure 13:
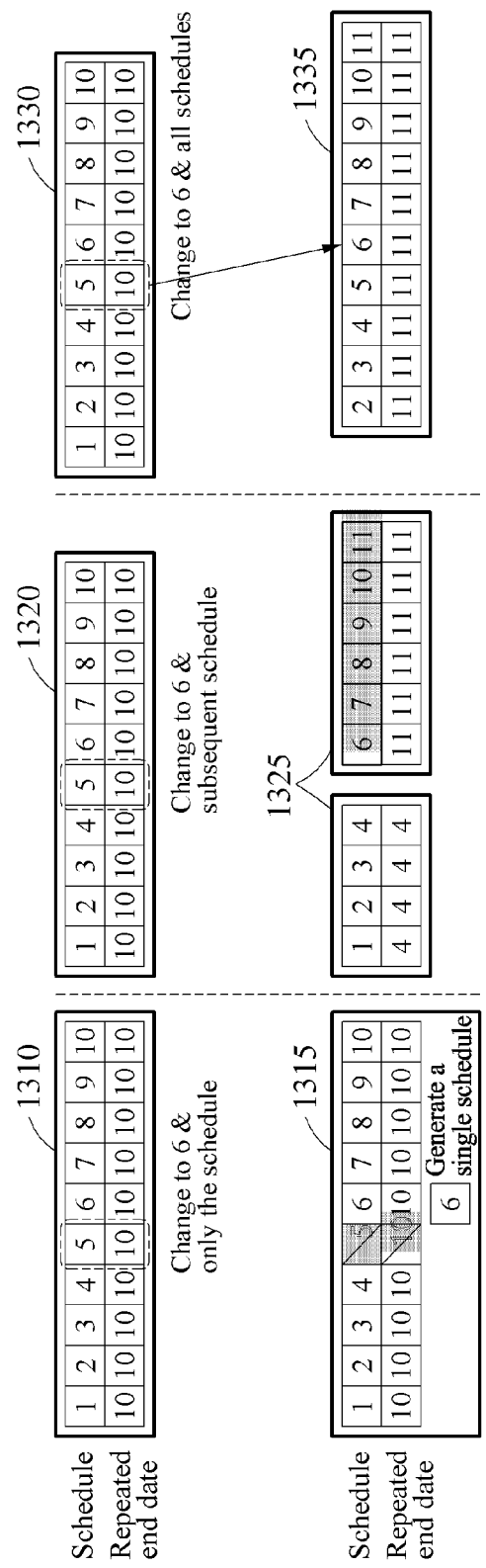
FIG. 13 is a drawing illustrating processing a repeated end date according to an embodiment.

FIG. 13 is a drawing illustrating processing a repeated end date according to an embodiment. Referring to FIG. 13, according to an embodiment, three scenarios of processing a repeated end date in a repeated schedule are shown.

For example, a repeated end date may be processed according to each option as follows on the repeated schedule. When a date of the schedule is changed in a state where the repeated end date is designated, the repeated end date may be moved together at the same interval. This is because there may be a problem when a date is designated to depart from a maximum range because there is a maximum value of the repeated end date on a periodic basis. Due to this, a problem may be prevented on usage flow which may occur according to implementation of changing the repeated end date.

Referring to FIG. 13, while a schedule for day 5 in a repeated schedule is changed to 6 in a state of an option 1310, 'a change of only the schedule' may be selected. In this case, the schedule for day 5 may be deleted from the repeated schedule, and a single schedule for day 6 may be generated.

While a schedule for day 5 in the repeated schedule is changed to 6 in a state of an option 1320, 'a change of all schedules after the schedule' may be selected. In this case, all of the schedule for day 5 to a schedule for day 10 may be changed to one day after the schedules on the repeated schedule, and all of repeated end dates of the schedules may be extended by one day. Furthermore, repeated end dates of a schedule for day 1 to a schedule for day 4 may be changed to day 4 which is one day before a schedule for day 5 which is a target to be changed.

While a schedule for day 5 in the repeated schedule is changed to 6 in a state of an option 1330, 'a change of all schedules' may be selected. In this case, all schedules in the repeated schedule may be changed to one day after all the schedules, and repeated end dates of the schedules may be extended by one day.

When the repeated end date is automatically changed, a notification that 'the end date is changed to confirm it' may be provided to a user. According to an embodiment, a notification may be provided only when a repeated end date to be stored becomes different from a previously stored repeated end date, or a notification may be provided whenever a repeated end date is changed in an edit screen.

Although not illustrated in the drawing, an instant messenger server according to an embodiment may include a processor and a communication interface. The instant messenger server may further include a memory. The processor, the communication interface, and the memory may be connected with each other via a communication bus. The instant messenger server may be, for example, a cloud server or a user device which performs the same or similar function to the cloud server.

The processor may perform at least one method described above with reference to FIGS. 1 to 10 or an algorithm corresponding to the at least one method. The processor may execute its program and may control the instant messenger server. A program code executed by the processor may be stored in the memory.

The foregoing embodiments may be realized by hardware elements, software elements and/or combinations thereof. The methods according to embodiments may be implemented with program instructions which may be executed through various computer means and may be recorded in computer-readable media. The described hardware display devices may be configured to act as one or more software modules to perform the inputs of embodiments, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents. Therefore, other implements, other embodiments, and equivalents to claims are within the scope of the following claims.

What is claimed is:

1. An operation method of an instant messenger server for providing a schedule service, the method comprising:
generating a first schedule which depends on an account of a host for an instant messaging service in response to a schedule generation request of the account of the host;
determining invitees based on at least one of a list of chat rooms the account of the host participates in and a list of friends of the account of the host in the instant messaging service;
synchronizing the first schedule which depends on the account of the host and at least one second schedule which depends on at least one account of at least one guest who participates in the first schedule among the invites, based on whether at least one of the invitees participates in the first schedule; and
providing a notification about the first schedule to at least one of users who participate in the first schedule, through a user interface (UI) of a chat room provided through the instant messaging service,
wherein the users include the host and the at least one guest, and
wherein a plurality of schedules which depends on an account of a user of the users in registered to a calendar for the user, through a plurality of chat rooms in which the user participates.

2. The method of claim 1, wherein the chat room includes at least one of:
a chat room for an official account corresponding to the schedule service; and
a chat room in which the host is participating and the schedule generation request occurs,
wherein the official account is an account in the instant messaging service and different from the accounts of the users.

3. The method of claim 1, wherein the notification about the first schedule includes at least one of a message for providing a notification that the first schedule is generated, a message for providing a notification that the first schedule is changed, and a message for providing a pre-notification of the first schedule.

4. The method of claim 1, further comprising:
transmitting a message for inviting the invitees to the first schedule through the UI of the chat room.

5. The method of claim 1, wherein the providing of the notification about the first schedule includes at least one of:
transmitting a message for providing a notification of the first schedule to a chat room for an official account corresponding to the schedule service;
transmitting a message for providing a notification of the first schedule to a chat room based on whether the schedule generation request occurs through the chat room in which the host is participating; and
transmitting a message for providing a notification of the first schedule to a chat room requested for sharing by the host, based on a schedule sharing request of the host.

6. The method of claim 1, wherein the schedule generation request is received in form of a message using a chatbot function provided by a chat room for an official account corresponding to the schedule service.

7. The method of claim 1, further comprising:
receiving a message for requesting to edit the first schedule which depends on the account of the host, using a chatbot function provided by a chat room for an official account corresponding to the schedule service;
editing the first schedule which depends on the account of the host; and
synchronizing the edited first schedule and the at least one second schedule which depends on the at least one account of the at least one guest who participates in the edited first schedule.

8. The method of claim 1, wherein the UI of the chat room includes a speech balloon of which a sender is set to an official account corresponding to the schedule service.

9. The method of claim 1, wherein if the account of the at least one guest edits the second schedule, the edited second schedule is not synchronized with other scheduled which depend on other accounts of other users of the users.

10. The method of claim 1, further comprising:
when the schedule generation request of the host is generated through a specific chat room, automatically inputting users who are participating in the chat room as the invitees.

11. The method of claim 1, further comprising:
at least one of:
providing a candidate chat room including invitee included in participant information, in response to a chat request associated with the first schedule;
providing a candidate chat room including a target to be attended among the invitees included in the participant information, in response to the chat request associated with the first schedule;
generating a new chat room including the invitee included in the participant information, in response to the chat request associated with the first schedule; and
generating a new chat room including the target to be attended among the invitees included in the participant information, in response to the chat request associated with the first schedule.

12. The method of claim 1, further comprising:
receiving an invitation request from a user who does not correspond to the invitees among users of a chat room with which the first schedule is shared;
receiving whether to accept the invitation request from the account of the host of the first schedule; and
updating participant information for the schedule, based on whether the host accepts the invitation request.

13. An operation method of an instant messenger application for providing a schedule service, the method comprising:

transmitting a schedule generation request for generating a first schedule which depends on an account of a host for an instant messaging service;
receiving invitees who are invited to the first schedule based on at least one of a list of chat rooms the account of the host participates and a list of friends of the account of the host in the instant messaging service;
synchronizing the first schedule which depends on the account of the host and at least one second schedule which depends on at least one account of at least one guest who participates in the first schedule among the invitees, based on whether at least one of the invitees participates in the first schedule; and
providing a notification about the first schedule to at least one of users who participate in the first schedule, through a UI of a chat room provided through the instant messaging service,
wherein the users include the host and the at least one guest,
wherein a plurality of schedules registered through a plurality of chat rooms in which a user of the users participates in registered to a calendar for the user.

14. The method of claim 13, wherein the chat room includes at least one of:
a chat room for an official account corresponding to the schedule service; and
a chat room in which the host is participating and the schedule generation request occurs,
wherein the official account is an account in the instant messaging service and different from the accounts of the users.

15. The method of claim 13, wherein the notification about the first schedule includes at least one of a message for providing a notification that the first schedule is generated, a message for providing a notification that the first schedule is changed, and a message for providing a pre-notification of the first schedule.

16. The method of claim 13, further comprising:
transmitting a message for inviting the invitees to the first schedule through the UI of the chat room.

17. The method of claim 13, wherein the providing of the notification about the first schedule includes at least one of:
transmitting a message for providing a notification of the first schedule to a chat room for an official account corresponding to the schedule service;
transmitting a message for providing a notification of the first schedule to a chat room based on whether the schedule generation request occurs through the chat room in which the host is participating; and
transmitting a message for providing a notification of the first schedule to a chat room requested for sharing by the host, based on a schedule sharing request of the host.

18. The method of claim 13, wherein the schedule generation request is received in a form of a message using a chatbot function provided by a chat room for an official account corresponding to the schedule service.

19. The method of claim 13, further comprising:
receiving a message for requesting to edit the first schedule which depends on the account of the host, using a chatbot function provided by a chat room for an official account corresponding to the schedule service;
editing the first schedule which depends on the account of the host; and synchronizing the edited first schedule and the at least one second schedule which depends on the at least on account of the at least one guest who participates in the edited first schedule.

20. The method of claim 13, wherein the UI of the chat room includes a speech balloon of which a sender is set to an official account corresponding to the schedule service.

21. The method of claim 13, wherein, if the account of the host is withdrawn in the instant messaging service, the first schedule remains and host information is indicated as being unknown to the invites in the instant messaging service.

22. The method of claim 13, further comprising:
at least one of:
displaying a candidate chat room including the invitee included in participant information, in response to a chat request associated with the first schedule;
displaying a candidate chat room including a target to be attended among the invitees included in the participant information, in response to the chat request associated with the first schedule;
displaying a new chat room including the invitee included in the participant information, in response to the chat request associated with the first schedule; and
displaying a new chat room including the target to be attended among the invitees included in the participant information, in response to the chat request associated with the first schedule.

23. The method of claim 13, further comprising:
transmitting a request to share the schedule to the server through the instant messaging service;
receiving an invitation request of a user who does not correspond to the invitees among users of a chat room with which the first schedule is shared;
receiving whether to accept the invitation request; and
transmitting information for updating participant information for first the schedule, based on whether to accept the invitation request.

24. A non-transitory computer readable medium to be combined with hardware and execute;
generating a first schedule which depends on an account of a host for an instant messaging service in response to a schedule generation request of the account of the host;
determining invitees based on at least one of a list of chat rooms the account of the host participates in and a list of friends of the account of the host in the instant messaging services;
synchronizing the first schedule which depends on the account of the host and at least one second schedule which depends on at least one account of at least one guest who participates in the first schedule among the invitees, based on whether at least one of the invitees participates in the first schedule; and
providing a notification about the first schedule to at least one of users who participate in the first schedule, through a user interface (UI) of a chat room provided through the instant messaging service,
wherein the users include the host and the at least one guest, and
wherein a plurality of schedules registered through a plurality of chat rooms in which a user of the users participates in registered to a calendar for the user.

* * * * *